(12) United States Patent
Gitsevich

(10) Patent No.: US 6,225,756 B1
(45) Date of Patent: May 1, 2001

(54) POWER OSCILLATOR

(75) Inventor: Aleksandr Gitsevich, Montgomery Village, MD (US)

(73) Assignee: Fusion Lighting, Inc., Rockville, MD (US)

( * ) Notice: Subject to any disclaimer, the term of this patent is extended or adjusted under 35 U.S.C. 154(b) by 0 days.

(21) Appl. No.: 09/616,987

(22) Filed: Jul. 14, 2000

Related U.S. Application Data

(62) Division of application No. 09/228,230, filed on Jan. 11, 1999.
(60) Provisional application No. 60/071,192, filed on Jan. 13, 1998, provisional application No. 60/071,284, filed on Jan. 13, 1998, provisional application No. 60/071,285, filed on Jan. 13, 1998, provisional application No. 60/083,093, filed on Apr. 28, 1998, provisional application No. 60/091,920, filed on Jul. 7, 1998, provisional application No. 60/099,288, filed on Sep. 4, 1998, provisional application No. 60/102,968, filed on Oct. 2, 1998, and provisional application No. 60/109,591, filed on Nov. 23, 1998.

(51) Int. Cl.$^7$ .................................................... H05B 41/16
(52) U.S. Cl. .......................... 315/248; 330/112; 330/282; 330/298; 331/107 R; 333/17.3; 333/195
(58) Field of Search .................. 315/248, 39, 111.51, 315/267, 344; 330/112, 107, 282, 286, 291, 298; 331/107 R, 167, 177 R, 185, 74; 333/17.3, 195, 139, 157

(56) References Cited

U.S. PATENT DOCUMENTS

| Re. 21,150 | 7/1939 | Lepel ..................................... 176/122 |
| Re. 32,527 | 10/1987 | Shinkawa et al. ...................... 331/99 |
| 843,534 | 2/1907 | Hewitt . | |

(List continued on next page.)

FOREIGN PATENT DOCUMENTS

| 38 42 756 | 6/1990 | (DE) . |
| 0309270 | 3/1989 | (EP) . |
| 0357453 | 3/1990 | (EP) . |
| 0457242 | 11/1991 | (EP) . |
| 0458546 | 11/1991 | (EP) . |
| 2170668 | 8/1986 | (GB) . |
| 8-148127 | 6/1996 | (JP) . |
| 93/21655 | 10/1993 | (WO) . |
| 97/45858 | 12/1997 | (WO) . |

OTHER PUBLICATIONS

Godyak, V.A., et al., "Electrical and light characteristics of RF–inductive fluorescent lamps", *J. of the Illuminating Engineering Society*, p 40–44(Winter 1994), presented at the 1993 IESNA Annual Conference.

Piejak, R.B. et al., "A simple analysis of an inductive RF discharge", *Plasma Sources Sci. Technol.* 1:179–186 (1992).

Thomson, J.J., "On the discharge of electricity through exhausted tubes without electrodes", *Phil. Mag.* S.5., vol. 32, No. 197, p. 321–464 (Oct. 1891), The London, Edinburgh, and Dublin Philosophical Magazine and Journal of Science.

(List continued on next page.)

*Primary Examiner*—Haissa Philogene
(74) *Attorney, Agent, or Firm*—Paul E. Steiner

(57) ABSTRACT

An oscillator includes an amplifier having an input and an output, and an impedance transformation network connected between the input of the amplifier and the output of the amplifier, wherein the impedance transformation network is configured to provide suitable positive feedback from the output of the amplifier to the input of the amplifier to initiate and sustain an oscillating condition, and wherein the impedance transformation network is configured to protect the input of the amplifier from a destructive feedback signal. One example of the oscillator is a single active element device capable of providing over 70 watts of power at over 70% efficiency. Various control circuits may be employed to match the driving frequency of the oscillator to a plurality of tuning states of the lamp.

15 Claims, 19 Drawing Sheets

U.S. PATENT DOCUMENTS

| | | | |
|---|---|---|---|
| 1,854,912 | 4/1932 | Spaeth . | |
| 2,333,052 | 10/1943 | Smith | 176/122 |
| 3,860,854 | 1/1975 | Hollister | 315/248 |
| 3,943,404 | 3/1976 | McNeil et al. | 315/39 |
| 4,007,392 | 2/1977 | Velfells et al. | 313/154 |
| 4,010,400 | 3/1977 | Hollister | 315/248 |
| 4,016,507 | 4/1977 | Havens | 331/96 |
| 4,021,727 | 5/1977 | Fellows | 324/20 R |
| 4,070,603 | 1/1978 | Regan et al. | 315/248 |
| 4,127,797 | 11/1978 | Perper | 315/209 R |
| 4,206,387 | 6/1980 | Kramer et al. | 315/248 |
| 4,245,178 | 1/1981 | Justice | 315/248 |
| 4,380,744 | 4/1983 | Kantorowicz | 331/107 R |
| 4,427,920 | 1/1984 | Proud et al. | 315/248 |
| 4,484,156 | 11/1984 | Khanna et al. | 331/60 |
| 4,547,750 | 10/1985 | Torizuka et al. | 331/99 |
| 4,613,796 | 9/1986 | Bay | 315/219 |
| 4,639,697 * | 1/1987 | Yarranton et al. | 333/155 |
| 4,705,987 | 11/1987 | Johnson | 313/634 |
| 4,736,454 | 4/1988 | Hirsch | 455/129 |
| 4,775,845 | 10/1988 | McCoy | 331/96 |
| 4,783,615 | 11/1988 | Dakin | 315/248 |
| 4,812,702 | 3/1989 | Anderson | 313/153 |
| 4,864,194 | 9/1989 | Kobayashi et al. | 315/248 |
| 4,894,590 | 1/1990 | Witting | 315/248 |
| 4,894,591 | 1/1990 | Witting | 315/248 |
| 4,906,946 | 3/1990 | Mekata et al. | 331/99 |
| 4,908,492 | 3/1990 | Okamoto et al. | 219/121.52 |
| 4,922,210 | 5/1990 | Flachenecker et al. | 331/167 |
| 4,926,791 | 5/1990 | Hirose et al. | 118/723 |
| 4,949,053 | 8/1990 | Havens | 331/96 |
| 4,982,168 | 1/1991 | Sigmon et al. | 331/107 SL |
| 5,039,903 | 8/1991 | Farrall | 313/160 |
| 5,070,277 | 12/1991 | Lapatovich | 315/248 |
| 5,072,157 | 12/1991 | Greb et al. | 315/248 |
| 5,084,801 | 1/1992 | El-Hamamsy et al. | 315/248 |
| 5,107,229 | 4/1992 | Cheesman | 331/185 |
| 5,118,997 | 6/1992 | El-Hamamsy | 315/248 |
| 5,159,346 | 10/1992 | Bosch et al. | 342/175 |
| 5,214,357 | 5/1993 | Dakin et al. | 315/248 |
| 5,237,288 * | 8/1993 | Cleveland | 330/107 |
| 5,259,436 | 11/1993 | Yun et al. | 164/97 |
| 5,289,139 | 2/1994 | Fiedziuszko et al. | 331/56 |
| 5,339,047 | 8/1994 | Mizan et al. | 330/286 |
| 5,367,226 | 11/1994 | Ukegawa et al. | 315/248 |
| 5,383,019 * | 1/1995 | Farrell et al. | 356/316 |
| 5,387,850 | 2/1995 | Bray et al. | 315/248 |
| 5,397,966 | 3/1995 | Vrionis et al. | 315/248 |
| 5,404,076 | 4/1995 | Dolan et al. | 313/572 |
| 5,448,137 | 9/1995 | Bobel | 315/244 |
| 5,483,206 | 1/1996 | Lohninger | 331/107 SL |
| 5,498,928 | 3/1996 | Lapatovich et al. | 315/39 |
| 5,498,937 | 3/1996 | Körber et al. | 315/248 |
| 5,500,574 | 3/1996 | Popov et al. | 315/248 |
| 5,541,482 | 7/1996 | Siao | 315/248 |
| 5,570,502 | 11/1996 | Sawtell et al. | 29/527.6 |
| 5,587,629 | 12/1996 | Gornstein | 315/200 R |
| 5,616,421 | 4/1997 | Sawtell et al. | 428/614 |
| 5,621,266 | 4/1997 | Popov et al. | 313/46 |
| 5,637,961 | 6/1997 | Ishii et al. | 315/111.51 |
| 5,661,365 | 8/1997 | Turner | 313/637 |
| 5,682,080 | 10/1997 | Dolan et al. | 313/570 |
| 5,688,357 * | 11/1997 | Hanawa | 156/345 |
| 5,834,895 | 11/1998 | Dolan et al. | 315/248 |
| 5,834,904 | 11/1998 | Waymouth | 315/248 |
| 5,841,243 | 11/1998 | Hooper | 315/248 |
| 5,841,244 | 11/1998 | Hooper | 315/248 |
| 5,852,339 | 12/1998 | Hamilton et al. | 313/11 |
| 5,866,985 * | 2/1999 | Coultas et al. | 315/111.21 |
| 5,886,478 | 5/1999 | Smith et al. | 315/248 |
| 5,886,479 | 5/1999 | Kennedy et al. | 315/248 |
| 5,962,986 | 10/1999 | Morse | 315/248 |
| 5,990,632 | 11/1999 | Smith et al. | 315/248 |
| 6,017,221 | 1/2000 | Flamm | 437/225 |

OTHER PUBLICATIONS

Wharmby, D., "Review of electrodeless discharges for lighting", Thorn Lighting Limited Presentation (Sep. 5, 1989).

Wharmby, D., "Electrodeless discharges for lighting", GE Lighting Europe Presentation (1994).

Wharmby, D.O., Ph.D., "Electrodeless lamps for lighting: A review", *IEEE Proceedings–A*, vol. 140, No. 6 (Nov. 1993).

Hagen, Jon B., "Radio–Frequency Electronics: Circuits and Applications", pp. 115–123, Cambridge University Press (1996).

Kipling, Kent, et al., "Low Wattage, Solid State Electrodeless Lamp Having High Brightness", *Journal of Technical Disclosure*, (Oct. 1, 1998).

"Low Wattage Solid State Electrodeless Lamp Having High Brightness", *Research Disclosure*, pp. 1341–1344 (Oct. 1998).

Martin, Jose L.J. and González, Francisco J.O., "Accurate Linear Oscillator Analysis and Design", *Microwave Journal*, pp. 22, 24, 26, 28, 30–32, 37 (entire article) (Jun. 1996).

Raab, Frederick, "Class–F Power Amplifiers With Maximally Flat Waveforms", *IEEE Transactions on Microwave Theory and Techniques*, vol. 45(11):2007–2012 (Nov. 1997).

PCT Application No. PCT/US99/00047.

* cited by examiner

POWER OSCILLATOR

CROSS REFERENCE TO RELATED APPLICATIONS

This application is a divisional of co-pending application Ser. No. 09/228,230, filed Jan. 11, 1999, and claims priority to provisional application Nos. 60/071,192, 60/071,284, and 60/071,285, all filed Jan. 13, 1998, Ser. No. 60/083,093, filed Apr. 28, 1998, Ser. No. 60/091,920, filed Jul. 7, 1998, Ser. No. 60/099,288, filed Sep. 4, 1998, Ser. No. 60/102,968, filed Oct. 2, 1998, and Ser. No. 60/109,591, filed Nov. 23, 1998, each of which is herein incorporated by reference in its entirety.

Certain inventions described herein were made with Government support under Contract No. DE-FG01-95EE23796 awarded by the Department of Energy. The Government has certain rights in those inventions.

BACKGROUND

1. Field of the Invention

The invention relates generally to a novel high power, high frequency solid state oscillator.

2. Related Art

Microwave solid state oscillators are described in various textbooks including "Microwave Solid State Circuit Design," written by I. Bahi and P. Bhartia (Wiley-Interscience Publication, 1988, Chapters 3 and 9) and "Microwave Circuit Design Using Linear and Nonlinear Techniques," written by George D. Vendelin, Anthony M. Pavio, and Ulrich L. Rohde (Wiley-Interscience Publication, 1990, Chapter 6). Articles on such oscillators include "Microwave Solid State Oscillator Circuits," written by K. Kurokawa (Microwave Devices, Wiley, 1976) and "Accurate Linear Oscillator Analysis and Design," written by J. L. Martin and F. J. Gonzales (Microwave Journal, June 1996 pp. 22–37).

Microwave oscillators utilizing solid state components and strip-line transmission lines are described in U.S. Pat. Nos. Re 32,527, 4,736,454, and 5,339,047. Solid state microwave oscillators having various feedback structures are described in U.S. Pat. Nos. 4,775,845, 4,906,946, 4,949,053, and 5,483,206.

Conventional solid state microwave oscillators produce relatively low power output, for example, ranging from a few hundred milliwatts (mW) up to a few watts (W) at most. Moreover, conventional solid-state microwave oscillators are relatively inefficient, typically less than 40%.

For higher power applications requiring a high frequency signal, the oscillator signal is typically provided to an amplifier to increase the output power. For example, FIG. 1 is a schematic diagram of a conventional system for providing a high power, high frequency signal. An oscillator 702 provides a low power, high frequency signal to an amplifier 704 which increases the power level and outputs a high power, high frequency signal.

A radio frequency (RF) powered electrodeless light source is one example of an application which could utilize a high power, high frequency signal source. For example, U.S. Pat. No. 4,070,603 discloses an electrodeless light source which is powered by a solid state microwave power source. The microwave power source described therein has the general structure shown in FIG. 1. Namely, the output of a relatively low power oscillator is applied to a power amplifier to provide a 40 W, 915 MHz signal, at a purported 50% direct current (DC) to RF efficiency.

SUMMARY

Various aspects, features, advantages, and applications of electrodeless lamps utilizing the novel oscillator of the present invention may be understood with reference to the parent '230 application.

An object of one aspect of the present invention is to describe an electrodeless aperture lamp which is powered by a solid state RF source in the range of several tens to several hundreds of watts.

Preferably, the lamp according to invention is extremely compact in size. Advantageously, the lamp can be conveniently packaged into a variety of configurations. For example, the bulb, RF source and DC power supply can be packaged together or each of these modules can be packaged and located separately. If separate, the bulb receives the RF energy through suitable transmission means (e.g., a coaxial cable).

Long life is a fundamental characteristic of electrodeless lamps. The elimination of all metal components in the bulb such as the filaments and electrodes, and the elimination of the accompanying glass to metal seals remove the dominant determinants of conventional lamp life times. The selection of specific bulb fills minimizes and in some cases eliminates the chemical interactions between the plasma and the bulb envelop. Such interactions can significantly affect the life time and color stability of conventional high intensity discharge lamps. Further, the lamp of the present invention is made more reliable through the use of all solid state electronics.

A novel solid-state oscillator preferably provides RF power to the lamp. One example of the oscillator is a single active element device capable of providing over 70 watts of power at over 70% efficiency. Various control circuits may be employed to match the driving frequency of the oscillator to a plurality of tuning states of the lamp.

According to one aspect of the invention, an oscillator includes an amplifier having an input and an output, and an impedance transformation network connected between the input of the amplifier and the output of the amplifier, wherein the impedance transformation network is configured to provide suitable positive feedback from the output of the amplifier to the input of the amplifier to initiate and sustain an oscillating condition, and wherein the impedance transformation network is configured to protect the input of the amplifier from a destructive feedback signal. The oscillator may further include a load connected to the output of the amplifier and the impedance transformation network is configured to protect the input of the amplifier from the destructive feedback signal as the load varies from a low impedance to a high impedance. Preferably, the impedance transformation network is configured to protect the input of the amplifier from the destructive feedback signal as the load varies from a short circuit to an open circuit. Preferably, the impedance transformation network comprises only micro-strip transmission lines, stubs, and non-inductive elements. For example, the impedance transformation network may include micro-strip transmission lines, stubs, and capacitor elements. The destructive feedback signal includes, for example, a high voltage and the impedance transformation network is configured to prevent the high voltage from building up at the output of the amplifier. Preferably, the impedance transformation network is further configured to transform the high voltage on the output side of the amplifier to a high current on the input side of the amplifier. Preferably, the impedance transformation network comprises dual feedback loops. More preferably, the dual feedback loops are substantially symmetrical. The dual feedback loops may be coupled to matching stubs at the input of the amplifier.

According to another aspect of the invention, the oscillator further includes an output impedance matching circuit having a first end connected to the output of the amplifier and a high impedance end coupled to the impedance transformation network. The output of the amplifier produces an RF output voltage and wherein the output impedance matching circuit comprises stubs configured to limit a reflected voltage on the high impedance end to at most two times the RF output voltage from the output of the amplifier.

According to a preferred aspect of the invention, the amplifier comprises a single active element providing an output signal having an output power in excess of 10 watts. Preferably, the oscillator exhibits an efficiency greater than 50 percent.

According to another aspect of the invention, an oscillator includes a tuning circuit having micro-strip transmission lines connected to the input of the amplifier, wherein the output of the amplifier produces an RF output voltage having an oscillating frequency with a third harmonic thereof, and wherein a sum of the lengths of the tuning circuit transmission lines is about one-half wavelength of the third harmonic of the oscillating frequency.

The foregoing and other aspects of the invention are achieved individually and in combination. The invention should not be construed as requiring two or more of the foregoing aspects unless expressly required by the claims.

BRIEF DESCRIPTION OF THE DRAWINGS

The invention will be better understood with reference to the accompanying figures, wherein.

DESCRIPTION

Figure 1:
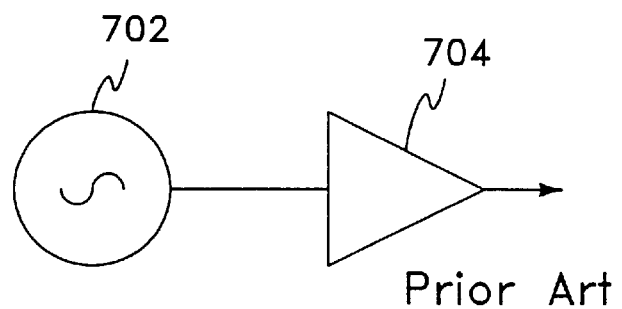
FIG. 1 is a schematic diagram of a conventional system for providing a high power, high frequency signal.

A number of parameters characterize highly useful sources of high frequency power. These include power output, oscillating frequency, DC to RF efficiency, reliability, mean time between failure (MTBF), economy, durability (working life), and others. For example, a highly efficient, high power output source with a long working life, particularly a power source with long MTBF, represents a highly desirable combination of operating features. High power, as used herein, is defined as greater than about 10 watts (W). Solid state microwave power sources have the potential to provide a much longer working life than, for example, magnetrons. However, due in part to relatively low power output and/or relatively low efficiency, conventional solid state microwave power sources have found only limited commercial applications, typically in low power applications.

The present invention provides one or more of the following advantageous operating features in a high frequency oscillator system:

Voltage protection of the active element

High efficiency

High output power

Low drift of the oscillating frequency

Low level of harmonics

Wide tolerance of load mismatch

Linear dependence of output power from DC drain voltage

Pulse width modulation of output power

Single active element (lower cost, higher reliability)

High durability, long working life

Small physical dimensions

Low weight

Voltage Protection

An obstacle to achieving a high power, high frequency oscillator with conventional circuits is that a high level of voltage may be fed back in excess of the breakdown limit of the device, thereby causing device failure. The present invention overcomes this problem.

According to one aspect of the invention, a high power oscillator includes an amplifier with a positive feedback loop configured to initiate and sustain an oscillating condition. The feedback loop comprises an impedance transformation circuit which transforms a high reflected voltage on the amplifier output to a proportionately lower voltage on the amplifier input to protect the amplifier from an over-voltage condition on its input. The voltage on the input is limited to less than the breakdown voltage of the amplifier input.

According to the invention, the feedback circuit utilizes micro-strip transmission lines and stubs to limit the maximum reflected voltage provided to the output side of the feedback circuit to a maximum of two times the voltage on the output of the amplifier. With the voltage on the output side of the feedback circuit thus limited to a fixed maximum, the feedback circuit is then configured to reduce the voltage fed back to the input side of the amplifier to some fraction of the output voltage which is within the safe operating limits of the amplifier. For example, a lumped capacitor circuit element may be utilized to couple with the output and reduce the voltage provided to the feedback circuit. As used herein, a "lumped" element refers to a discrete electrical component.

Load Tolerance

In some applications, the load driven by an oscillator varies widely during operation. For example, an electrodeless lamp presents a high impedance load when there is no discharge in the bulb and a low impedance load when the lamp is lit. Thus, during lamp ignition, or if the lamp extinguishes, the load changes dramatically. These load changes cause high voltage reflections which are potentially destructive if fed back to the amplifier input. Conventional oscillator circuits which include lumped elements in the feedback circuit typically include lumped inductor elements which have a high quality factor (Q) and are thus more susceptible to feeding back destructive high voltage from such voltage reflections.

According to the invention, the oscillator circuit operates without destruction of the amplifier element at all phase angles and at all magnitudes from open to short circuit. Preferably, the feedback circuit includes only transmission lines and non-inductive lumped elements.

According to another aspect of the invention, the feedback circuit comprises impedance transformation circuits in two feedback loops with reduced feedback voltage on each loop. For example, two smaller lumped capacitor elements are utilized (one for each loop) to decrease the coupling between the output and the input and thereby reduce the voltage in each loop. This improves load tolerance because of improved voltage protection. Preferably, the two feedback loops are symmetrical so that the voltage provided to each feedback loop is the same. Symmetrical dual feedback loops also improve efficiency.

According to another aspect of the invention, a four way junction of micro-strip transmission lines (e.g. a microwave cross) is connected to the amplifier output to provide distribution of current and minimize inductance at the amplifier output.

Load Sensitivity

According to another aspect of the invention, the oscillator includes an output impedance matching circuit connected to the amplifier output and the feedback circuit is coupled with a high impedance end of the output impedance matching circuit to reduce sensitivity to the load impedance.

Circuit Size

According to another aspect of the invention, lumped capacitors element are utilized in the feedback circuit to reduce the circuit size by adding phase shift to the feedback circuit without long lengths of transmission line. The circuit size is further reduced by selecting suitable dielectric material to reduce the physical length and/or width of the transmission lines while maintaining suitable electrical length.

Pulse Width Modulation

The oscillator examples described below may be configured with a gating pulse applied to the gate of the active element to turn the oscillator off for some fraction of a cycle and thereby reduce the average output power delivered to the load. This form of pulse width modulation allows for dimming of the lamp from full brightness down to about 30% of full brightness.

Thus, the present invention provides a power source which is suitable for many commercially practical applications, including high power applications such as electrodeless lighting. Of course, depending on the application one or more of the above features may not be required. The above features are achieved individually and in combination, and it is not intended that the present invention be construed as requiring two or more of the features unless expressly required by the claims attached hereto.

The invention is hereinafter described with respect to seven specific circuit examples. Exemplary part numbers for each of the first through seventh examples are as follows:

TABLE 6

| Example | Q1 | C1 | C2 | C3 | C4 | C5 | C6 | C7 | C8 | C9 | C10 | L1 | R1 | R2 | R3 | R4 | D1 |
|---|---|---|---|---|---|---|---|---|---|---|---|---|---|---|---|---|---|
| First | 1 | 9 | 4 | 7 | 8 | 4 | 12 | 14 | — | — | — | 15 | 16 | 20 | 20 | 16 | 23 |
| Second | 1 | 5 | 5 | 8 | 8 | 5 | 13 | 9 | — | — | — | 15 | 22 | 18 | — | — | — |
| Third | 1 | 4 | 6 | 4 | 8 | 4 | 8 | 10 | 14 | 13 | 9 | 15 | 16 | 17 | 21 | — | 24 |
| Fourth | 1 | 4 | 4 | 8 | 8 | 10 | 13 | 14 | 9 | — | — | 15 | 16 | 17 | 21 | — | 24 |
| Fifth | 2 | 5 | 5 | 8 | 8 | 10 | 11 | 14 | 9 | — | — | 15 | 16 | 17 | 21 | — | 24 |
| Six | 1 | 5 | 5 | 8 | 8 | 10 | 11 | 14 | 9 | — | — | 15 | 22 | 17 | 21 | — | 24 |
| 7th | 3 | 5 | 5 | 8 | 8 | 5 | 10 | 11 | 14 | 9 | — | 15 | 22 | 19 | 19 | 17 | 25 | where:

TABLE 7

| | | | |
|---|---|---|---|
| 1 | Motorola ® MRF184 | 14 | 4.7 µF surface mount capacitor |
| 2 | Ericson ® E10044-E9584 | 15 | 0.4 µH wire wound inductor |
| 3 | Motorola ® MRF184S | 16 | 0 to 5.1 K ohm surface mount variable resistor |
| 4 | 0.7 to 2.6 pF surface mount variable capacitor | 17 | 2.1 K ohm surface mount resistor |
| 5 | 0.6 to 2.5 pF surface mount variable capacitor | 18 | 2.2 K ohm surface mount resistor |
| 6 | 1.5 to 9 pF surface mount variable capacitor | 19 | 5 K ohm surface mount resistor |
| 7 | 2.5 to 8 pF surface mount variable capacitor | 20 | 10 K ohm leaded resistor |
| 8 | 22 pF surface mount capacitor | 21 | 15 K ohm surface mount resistor |
| 9 | 130 pF surface mount capacitor | 22 | 100 K ohm surface mount resistor |
| 10 | 470 pF surface mount capacitor | 23 | Varactor diode |
| 11 | 100 nF surface mount capacitor | 24 | Zener diode |
| 12 | 130 nF surface mpunt capacitor | 25 | surface mount Zener diode |
| 13 | 150 nF surface mount capacitor | | |

Exemplary performance characteristics for each of the first through seventh examples are as follows:

where the first column corresponds to the example number and:
V—DC Voltage;
%—DC to RF Efficiency; and
f—Oscillating frequency in MHz.

Examples of High Power Oscillators

Figure 2:
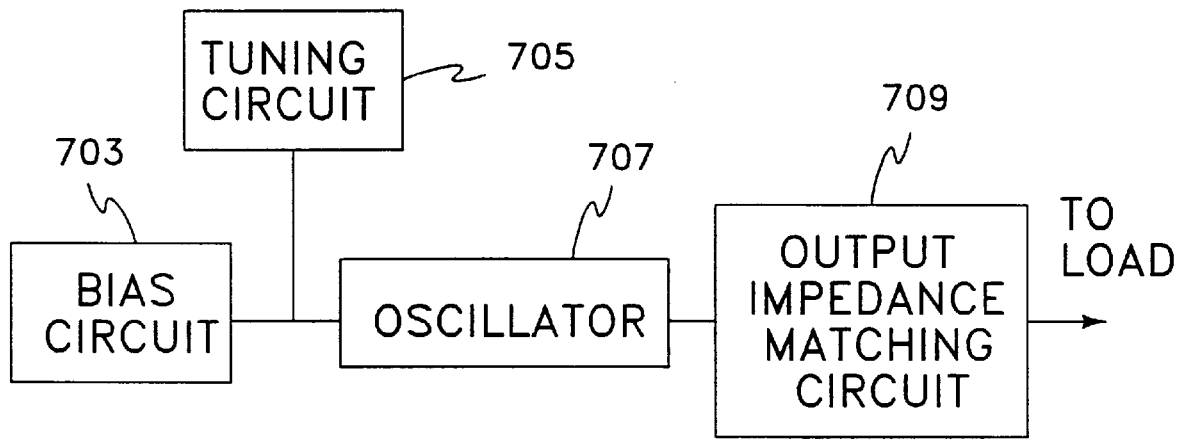
FIG. 2 is a block-level schematic diagram of an oscillator system according to the invention for producing a high power, high frequency signal.

FIG. 2 is a block-level schematic diagram of an oscillator system according to the invention for producing a high power, high frequency signal. A power supply circuit (not shown) provides a DC voltage to an oscillator 707 and a bias circuit 703. The bias circuit 703 provides a suitable DC voltage to the oscillator 707 to bias the active element of the oscillator 707. For example, the bias circuit 703 provides sufficient bias for the active element to initially operate in its linear region with enough gain to support oscillation. The oscillator 707 oscillates at a design frequency which is tuned by a tuning circuit 705. The oscillator 707 provides a high power, high frequency signal to an output impedance match-

TABLE 8

| | 30 Watts | | | 40 Watts | | | 50 Watts | | | 60 Watts | | | 70 Watts | | |
|---|---|---|---|---|---|---|---|---|---|---|---|---|---|---|---|
| | V | % | f | V | % | f | V | % | f | V | % | f | V | % | f |
| 1 | 21.4 | 60 | 864.0 | 23.2 | 62 | 866.0 | 25.1 | 63 | 867.0 | 27.2 | 61 | 868.0 | — | — | — |
| 2 | 14.0 | 71 | 749.5 | 16.0 | 71 | 750.4 | 18.0 | 71 | 751.0 | 19.9 | 69 | 751.4 | 21.9 | 67 | 751.6 |
| 3 | 18.0 | 67 | 879.7 | 20.7 | 67 | 880.6 | 23.2 | 66 | 881.1 | 25.6 | 65 | 881.6 | — | — | — |
| 4 | — | — | — | 17.2 | 70 | 763.4 | 19.2 | 71 | 764.7 | 21.2 | 71 | 765.8 | 23.2 | 71 | 765.9 |
| 5 | 16.7 | 70 | 771.5 | 19.6 | 68 | 773.0 | 22.6 | 65 | 774.0 | 26.2 | 62 | 775.0 | — | — | — |
| 6 | 17.8 | 67 | 746.4 | 20.2 | 68 | 748.9 | 22.8 | 68 | 750.0 | 25.0 | 68 | 751.0 | 27.0 | 68 | 752.0 |
| 7 | 13.9 | 73 | 748.5 | 16.0 | 74 | 749.5 | 17.9 | 74 | 750.3 | 19.8 | 73 | 750.7 | 21.5 | 72 | 751.0 | ing circuit 709, which may be connected to a suitable load.

Single Impedance Transformation Network Feedback Circuit

Figure 3:
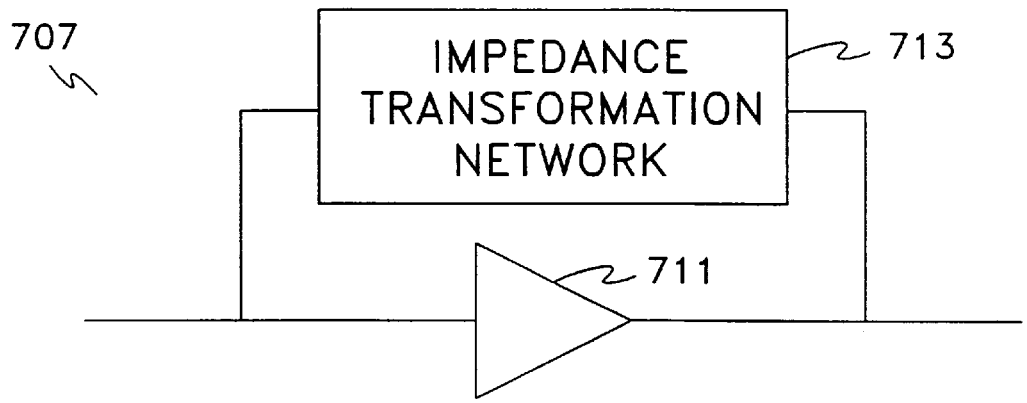
FIG. 3 is a block-level schematic diagram of an oscillator 707 according to the invention utilizing an impedance transformation network in a feedback circuit.

FIG. 3 is a block-level schematic diagram of an oscillator 707 according to the invention utilizing an impedance transformation network in a feedback circuit. According to the invention, an output of an amplifier 711 is fed back to an input of the amplifier 711 through an impedance transformation network 713.

The impedance transformation network 713 is configured to provide suitable positive feedback for initiating and sustaining an oscillating condition. According to the invention, the impedance transformation network 713 is further configured to protect the amplifier input, during high output power operation, from an over-voltage condition which would otherwise destroy the device. For example, the voltage protection is achieved by preventing voltage build up at the output through controlled voltage reflections and transforming a high voltage at the output terminal of the amplifier 711 to a low voltage at the input terminal of the amplifier 711, which assures that the maximum voltage-breakdown rating of the amplifier is not exceeded.

According to the invention, the impedance transformation network 713 is preferably further configured to create a matching condition between the amplifier input impedance and the feedback circuit to improve efficiency. The amplifier 711 is preferably biased near cutoff so that the circuit operates efficiently.

Figure 4:
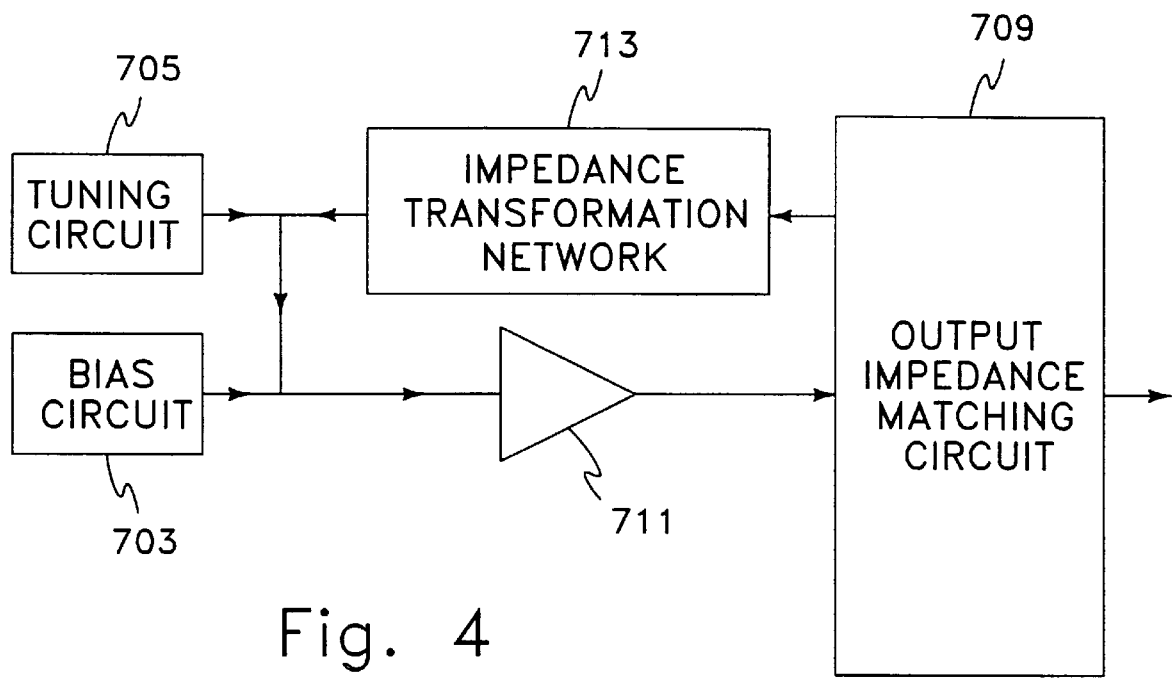
FIG. 4 is a block-level schematic diagram of an oscillator system according to the invention incorporating the oscillator from FIG. 3.

FIG. 4 is a block-level schematic diagram of an oscillator system according to the invention incorporating the oscillator from FIG. 3. In FIG. 4, the impedance transformation network 713 is not directly coupled to the drain, but is instead coupled to the output impedance matching network 709. Preferably, there is a relatively high impedance (e.g. greater than about 100 ohms reactance) between the point of connection and the drain output. By coupling to the output impedance matching circuit 709 at a high impedance point, the feedback loop has less influence on the drain output and the oscillator system is less sensitive to the load impedance.

First Example of a High Power Oscillator

Figure 5:
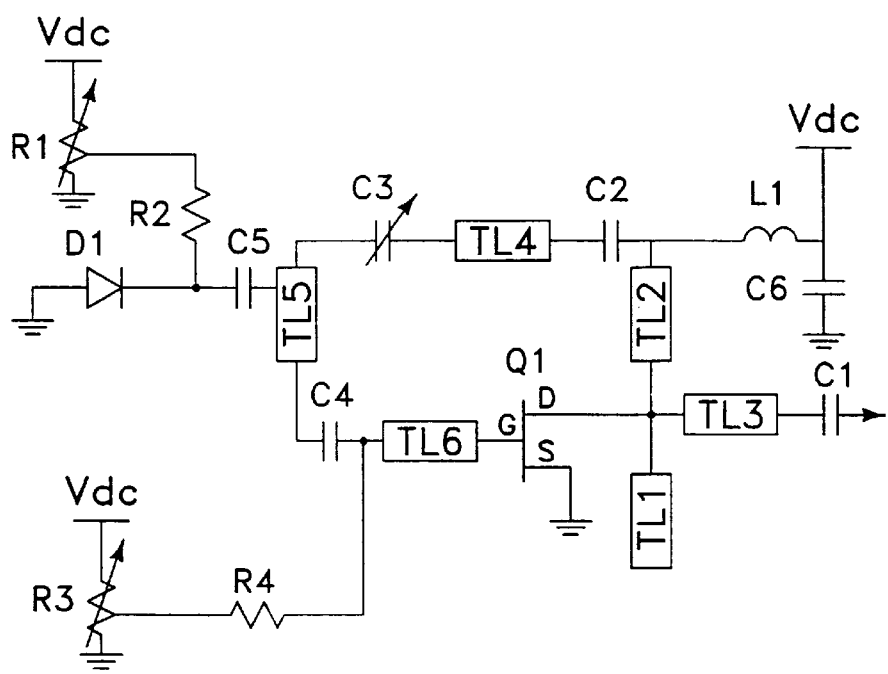
FIG. 5 is a circuit-level schematic diagram of a first example of an oscillator system according to the invention.

FIG. 5 is a circuit-level schematic diagram of a first example of an oscillator system according to the invention. A transistor Q1 has a source terminal S which is grounded. An output from a drain terminal D is connected to an output impedance matching circuit including a transmission line TL1 (with a characteristic impedance Z1) connected at one end to the drain D and unconnected at the other end, a transmission line TL2 (with a characteristic impedance Z2) connected at one end to the drain D and to a feedback circuit at the other end, and a transmission line TL3 (with a characteristic impedance Z3) connected at one end to the junction of TL1 and TL2 and connected at the other end in series with a first lead of a capacitor C1, the other lead of C1 providing an output which may be connected to a load.

The feedback circuit is connected between the end of the transmission line TL2 and an input of the transistor Q1 at a gate terminal G and includes a capacitor C2, a transmission line TL4 (with a characteristic impedance Z4), a capacitor C3, a transmission line TL5 (with a characteristic impedance Z5), a capacitor C4, and a transmission line TL6 (with a characteristic impedance Z6) connected in series.

A DC supply voltage Vdc provides power to the oscillator system through an RF filter circuit, a tuning circuit, and a bias circuit for the transistor Q1. The RF filter circuit includes inductor L1 and a filter capacitor C6 and provides a DC operating voltage to the drain D of the transistor Q1.

The tuning circuit includes a variable resistor R1 which is a three terminal device, wherein a first and second terminal are respectively connected to opposite ends of a variable voltage divider and a third terminal is connected at the junction of the voltage divider. In FIG. 5, the first terminal is connected to Vdc, the second terminal is connected to ground, and the third terminal is connected to one end of a resistor R2. The other end of resistor R2 is connected to a junction of a cathode end of a varactor diode D1 and a capacitor C5. The other end of diode D1 is grounded. The other end of capacitor C5 is connected to the transmission line TL5. The resistors R1 and R2, the varactor diode D1, and the capacitor C5 provide a tuning function for the oscillator system.

The bias circuit includes a variable resistor R3 with the first terminal connected to Vdc and the second terminal connected to ground. The third terminal of R3 is connected to one end of a resistor R4. The other end of the resistor R4 is connected to the transmission line TL6. The bias circuit provides a DC bias voltage to the gate G of the transistor Q1.

Figure 6:
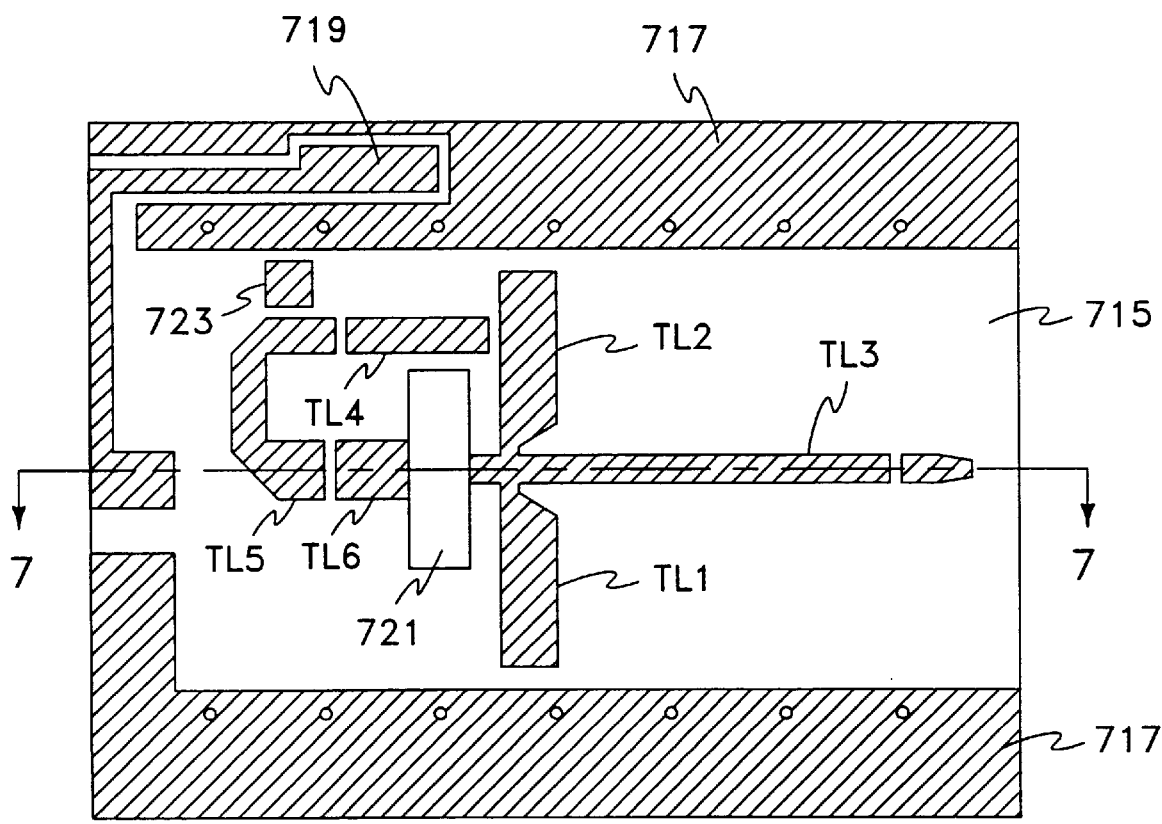
FIG. 6 is a printed circuit board layout suitable for use in implementing the circuit set forth in the first example.
Figure 7:
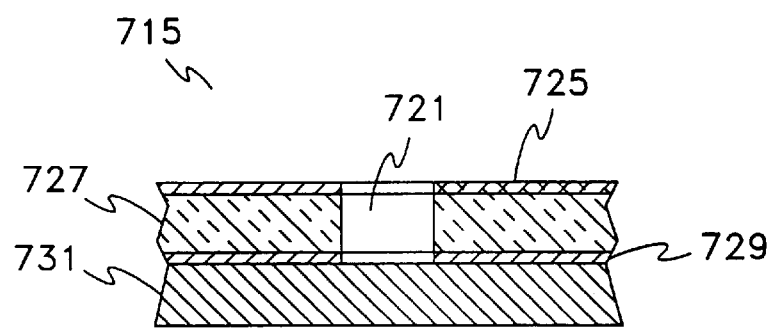
FIG. 7 is a cross-section view of the printed circuit board taken along line 7—7 in FIG. 6.

FIG. 6 is a printed circuit board layout suitable for use in implementing the circuit set forth in the first example. Overall board dimensions are about 102 mm (4 inches) by about 76 mm (3 inches). The thickness of the dielectric material is about 1.27 mm (0.05 inch), and the dielectric constant is about 9.2. FIG. 7 is a cross-section view of the printed circuit board taken along line 7—7 in FIG. 6. As can be seen in FIG. 7, a printed circuit board 715 includes a layer 725 for conductive traces, a dielectric layer 727, and a ground plane layer 729. Preferably, the printed circuit 715 is further mounted to a metal plate 731 which is electrically connected to the ground plane 729. In the first example, the printed circuit board 715 further includes a cutout portion 721, which is sized to accommodate the active element of the oscillator circuit.

The printed circuit board 715 has conductive traces TL1–TL6 disposed thereon which are transmission lines respectively corresponding to the various characteristic impedances Z1–Z6. Ground areas 717 are also disposed on the top layer 725 and are electrically connected to the ground plane 729 by plated through holes or other conventional methods. A conductive area 719 is isolated from the ground area 717 and provides a connection area for the DC supply voltage Vdc. Another conductive area 723 provides a connection area for the tuning circuit. Approximate characteristic impedances and electrical lengths for each of the transmission lines are as follows.

TABLE 9

| TRANSMISSION LINE | CHARACTERISTIC IMPEDANCE | ELECTRICAL LENGTH |
| --- | --- | --- |
| TL1 | Z1 = 25 Ohm | 0.154 λg |
| TL2 | Z2 = 25 Ohm | 0.154 λg |
| TL3 | Z3 = 50 Ohm | Not applicable |
| TL4 | Z4 = 40 Ohm | 0.115 λg* |
| TL5 | Z5 = 40 to 25 Ohm* | 0.23 λg |
| TL6 | Z6 = 25 Ohm | 0.016 λg |

*TL5 transitions from 40 Ohms to 25 Ohms to match the 40 Ohm impedance of TL4 with the 25 Ohm impedance of TL6.

Figure 8:
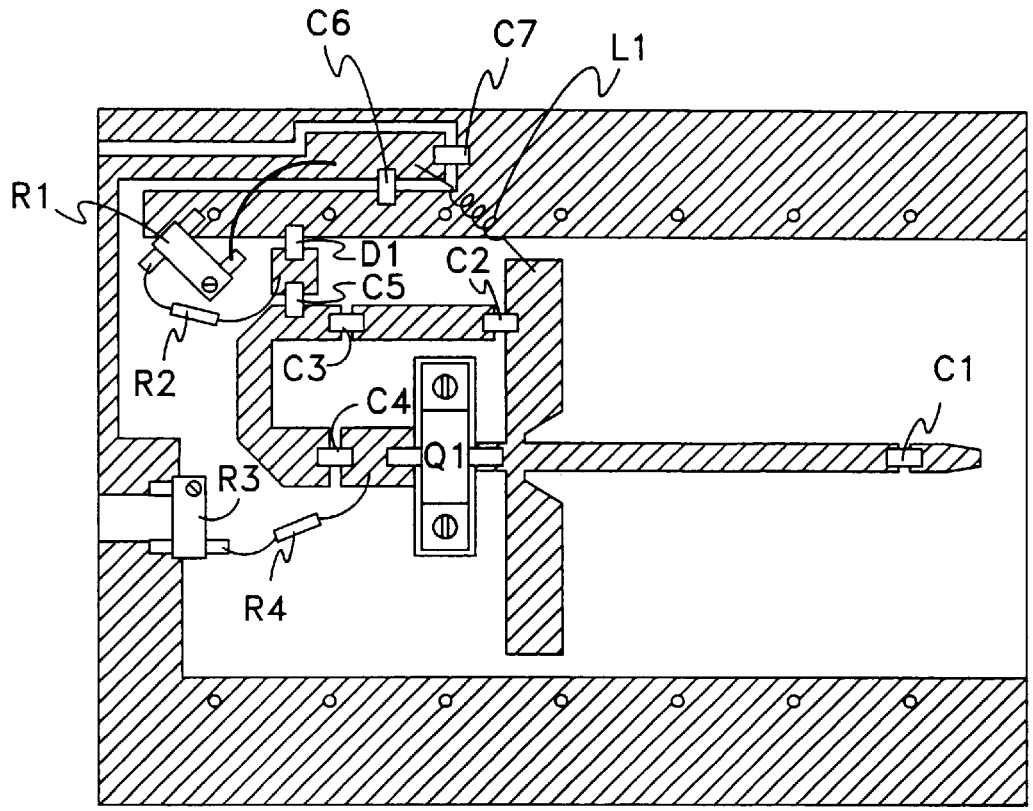
FIG. 8 is an assembly-level schematic diagram of the printed circuit board from FIG. 6 populated with suitable electronic devices and other parts for implementing the oscillator system of the first example.

FIG. 8 is an assembly-level schematic diagram of the printed circuit board from FIG. 6 populated with suitable electronic devices and other parts for implementing the oscillator system of the first example. Reference designators in FIG. 8 corresponds to like circuit elements in FIG. 5. Q1 is preferably a power field effect transistor (FET), for example, a metal-oxide semiconductor (MOS) field effect transistor (MOSFET) fabricated with laterally diffused MOS (LDMOS) technology. As set forth in FIG. 8, the source terminal of Q1 provides mounting holes through which a screw or bolt is inserted for mounting Q1 to the metal plate 731 and making the electrical connection from the source terminal of Q1 to ground. The source terminal S of the transistor Q1 is preferably also soldered to the metal plate 731 so that Q1 is well grounded (i.e. RF current flows over a wide area of the wave structure). The metal plate 731 also provides a heat sink for the transistor Q1 and is referred to as a heat spreader. The gate G and drain D terminals of Q1, and the remaining electrical components are mechanically and electrically secured to the printed circuit board 715 by soldering or other conventional means.

General operation of the circuit is as follows. A DC voltage Vdc is applied to the circuit. The voltage Vdc is supplied to the drain D of the transistor Q1 through the RF filter circuit. The drain voltage may be varied from about 20 V to about 28 V. The voltage Vdc is also supplied to the gate G of the transistor Q1 through a voltage divider circuit which is configured to provide a gate bias voltage to the transistor near cutoff which initially places the transistor Q1 at an operating point just inside its linear region. For example, for the above-specified Motorola® MRF184 the gate voltage is set to about 4V. The voltage Vdc is also supplied to the varactor diode D1 through a voltage divider circuit. Varying the voltage provided to D1 tunes the oscillating frequency.

Once the voltage Vdc is applied to the circuit, the transistor Q1 conducts. Some amount of random noise is inherent in the circuit. Noise which is present on the drain D is fed back through the feedback loop and amplified. This process initiates the oscillation. Once initiated, the oscillation becomes sustained at the design frequency. To sustain oscillation at the design frequency, the time delay (i.e. phase shift) in the feedback loop and the transistor Q1 should be approximately equal to $1/(2 \times f_{osc})$, where $f_{osc}$ is the design frequency.

The transmission lines TL1 and TL2 are stubs configured such that the length of transmission line between the drain D and the TL1, TL2 stubs' junction together with the length of the stubs TL1, TL2 result in an impedance match of drain impedance to the impedance of the transmission line TL3 (e.g. a characteristic impedance Z3 of about 50 ohms). Characteristic of the transmission line arrangement for TL1 is that the maximum reflected voltage seen at any point on TL1 is at most two times the voltage applied to TL1 from a conjugately matched source. Thus, the voltage on the open (i.e. high impedance) end of the stub TL1 (i.e. the end of TL1 distal to the drain) is limited to at most two times the voltage on the amplifier output (i.e. the drain RF voltage). This voltage is progressively decreased through the feedback circuit so that the voltage at the input side of the active device (i.e. the gate) is significantly less than two times the voltage on the drain. The RF voltage fed back to the gate G is, however, sufficiently high to produce a large current in the transistor Q1.

Moreover, in order to achieve the desired voltage protection under all load conditions, the feedback circuit is configured such that even if the gate voltage instantaneously doubles (e.g. due to a doubling of the voltage at TL1), the doubled gate voltage is within the safe operating limit of the device. For example, for the above-specified Motorola® MRF184 the gate to source breakdown voltage is about 20V. During operation, the circuit is configured to operate with a gate voltage of about 8V plus the DC bias voltage of 4V for a total gate to source voltage of about 12V. If the operating voltage were to instantaneously double, the gate voltage would be about 16V plus the DC bias voltage of 4V for a total of 20V which is within the safe operating limits of the device.

Dual Impedance Transformation Network Feedback Circuit

Figure 9:
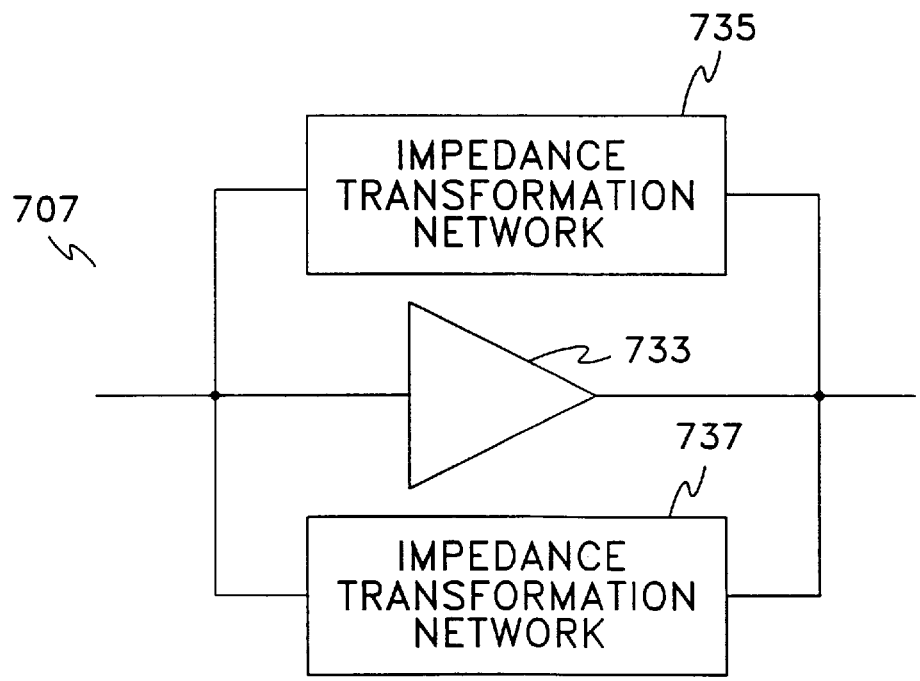
FIG. 9 is a block-level schematic diagram of an oscillator according to the invention utilizing dual impedance transformation networks in respective feedback circuits.

Further improvements in output power, efficiency, and working life are achieved by an oscillator according to the invention which utilizes two feedback circuits. FIG. 9 is a block-level schematic diagram of an oscillator according to the invention utilizing dual impedance transformation networks in respective feedback circuits. According to the invention, an output of an amplifier 733 is fed back to an input of the amplifier 733 through a first impedance transformation network 735 and a second impedance transformation network 737.

Figure 10:
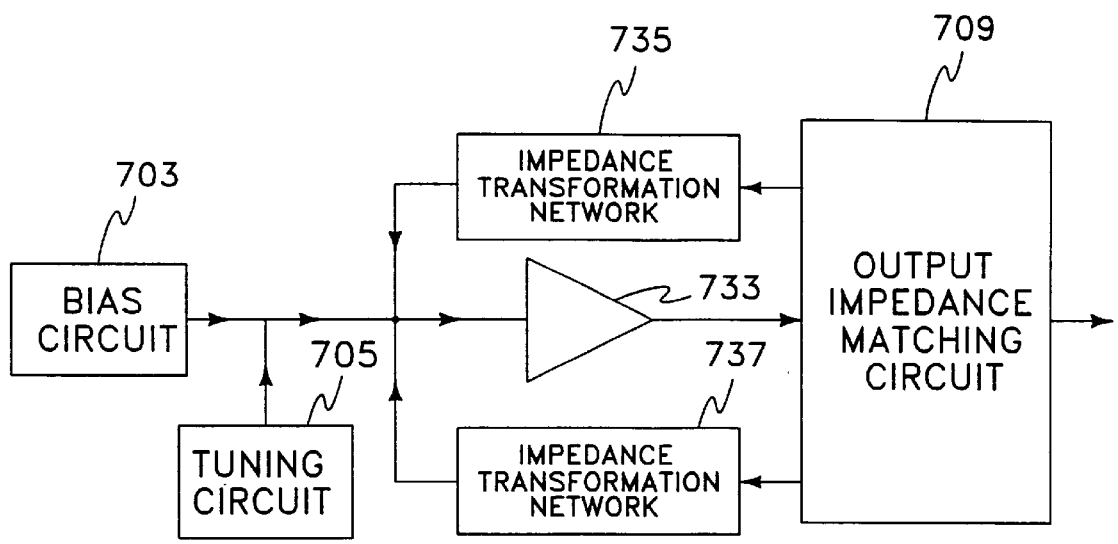
FIG. 10 is a block-level schematic diagram of an oscillator system according to the invention incorporating the oscillator from FIG. 9.

FIG. 10 is a block-level schematic diagram of an oscillator system according to the invention incorporating the oscillator from FIG. 9. In FIG. 10, the impedance transformation networks 735 and 737 are not directly coupled to the drain, but are instead coupled to the output impedance matching circuit 709 to improve the load impedance sensitivity as discussed above with respect to FIG. 4.

According to the invention, the dual impedance transformation networks 735, 737 are configured to provide suitable positive feedback for initiating and sustaining an oscillating condition. As in the first example, the dual impedance transformation networks are further configured to protect the amplifier input, during high output power operation, from an over-voltage condition which would otherwise destroy the device. Advantageously, the dual impedance transformation feedback networks provide even greater positive feedback to the amplifier input, as compared to a single feedback circuit, and at the same time improve the voltage protection and improve efficiency. By utilizing two feedback loops, the feedback current to the gate remains high while the feedback voltage in each feedback line is halved. Because the destruction of the device is caused largely by over-voltage conditions, the voltage protection is significantly improved. In some of the following examples, full voltage swing and/or class C operation may be achieved.

Second Example of a High Power Oscillator

Figure 11:
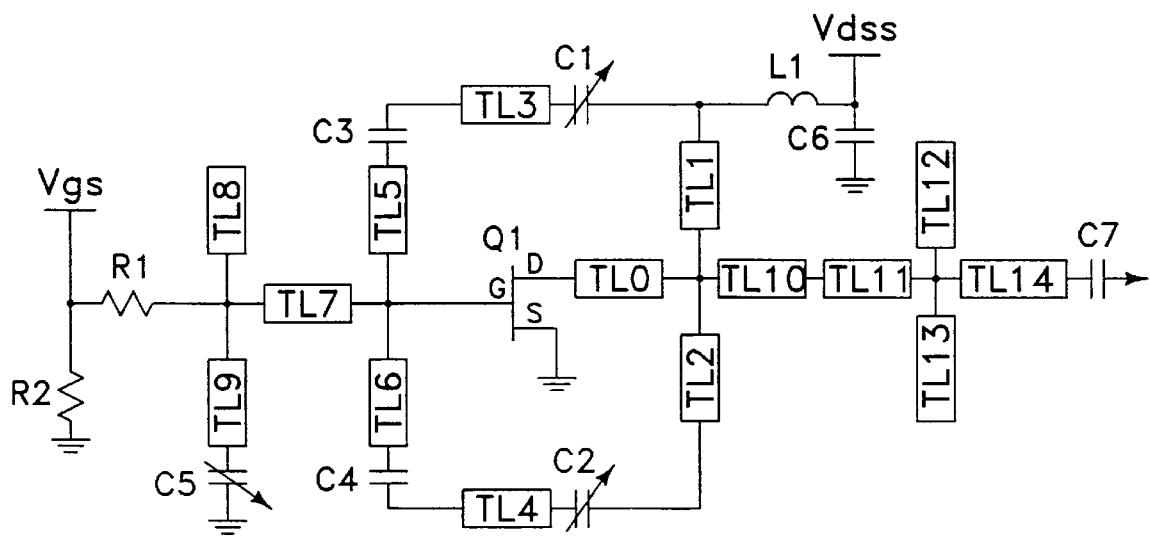
FIG. 11 is a circuit-level schematic diagram of a second example of an oscillator system according to the invention.

FIG. 11 is a circuit-level schematic diagram of a second example of an oscillator system according to the invention. A transistor Q1 has a source terminal S which is grounded. An output of the transistor Q1 is taken from a drain terminal D and is connected to an output impedance matching circuit including a transmission line TL0 (with a characteristic impedance Z0) connected at one end to the drain D and connected at the other end between respective ends of two transmission lines TL1 and TL2 (with characteristic impedances Z1 and Z2, respectively). The other end of TL1 is connected to a first feedback circuit. The other end of TL2 is connected to a second feedback circuit. The output impedance matching circuit further includes a transmission line TL10 (with a characteristic impedance Z10) connected at one end to the junction of TL0, TL1, and TL2 and connected at the other end to an end of transmission line TL11 (with a characteristic impedance Z11). The other end of TL11 is connected to a junction of transmission lines TL12, TL13, and TL14 (with respective characteristic impedances Z12, Z13, and Z14). TL12 and TL13 are matching stubs which are unconnected at their respective other ends. The other end of transmission line TL14 is connected in series with a capacitor C7. The output of the capacitor C7 may be supplied to a load.

The first feedback circuit is connected between the end of the stub TL1 which is distal to the drain D and an input of the transistor Q1 at a gate terminal G. The first feedback circuit includes a capacitor C1, a transmission line TL3, a capacitor C3, and a transmission line TL5 connected in series. The second feedback circuit is connected between the end of the stub TL2 which is distal to the drain D and the gate G and includes a capacitor C2, a transmission line TL4, a capacitor C4, and a transmission line TL6 connected in series.

A DC supply voltage Vdss provides operating voltage to the drain D of the transistor Q1 through an RF filter circuit including an inductor L1 and capacitor C6. In FIG. 11, one end of the inductor L1 is connected to Vdss and the other end of the inductor L1 is connected at the junction of C1 and TL1. One end of the capacitor C6 is connected to Vdss and the other of the capacitor C6 is connected to ground.

A DC supply voltage Vgs provides bias voltage to the gate G of the transistor Q1 through a bias circuit including resistors R1 and R2. In FIG. 197, one end of the resistor R1 is connected to Vgs and the other end of the resistor R1 is connected in series with a transmission line TL7 which is connected to the gate G. One end of the resistor R2 is connected to Vgs and the other end of the resistor R2 is connected to ground.

The oscillator system illustrated in FIG. 11 further includes a tuning circuit comprising a transmission line TL8 (with a characteristic impedance Z8) which is unconnected at one end and at the other end is connected in series with a transmission line TL9 (with a characteristic impedance Z9) and a trimming capacitor C5, which is RF-grounded. The junction of the transmission line TL8 and the transmission line TL9 is connected to the junction of the resistor R1 and the transmission line TL7.

Figure 12:
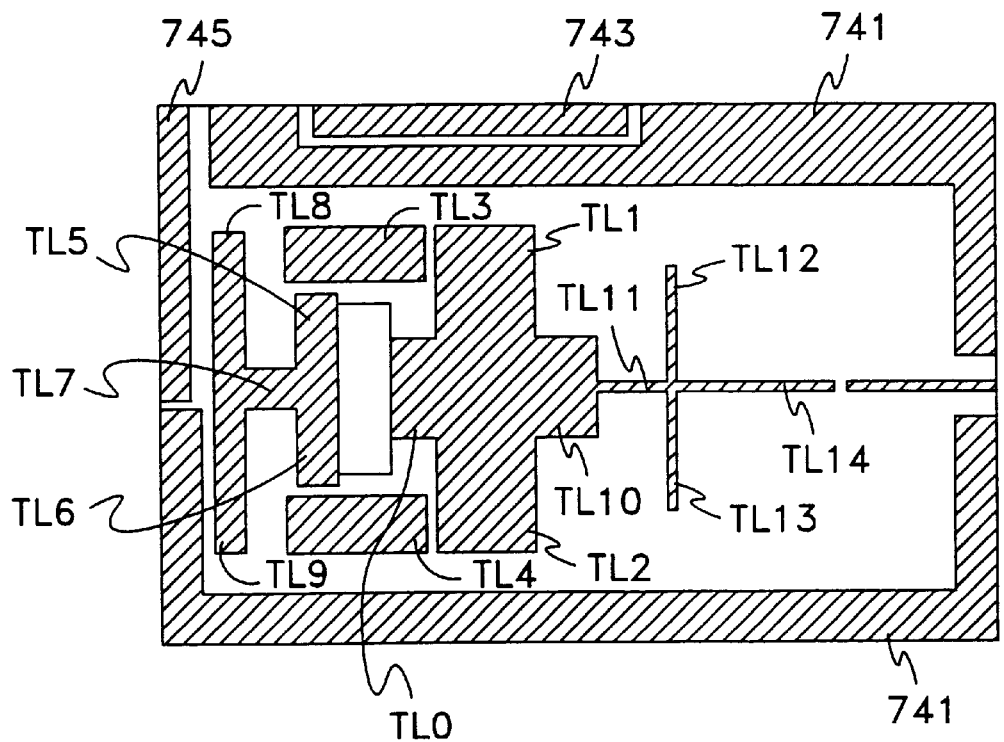
FIG. 12 is a printed circuit board layout suitable for use in implementing the circuit set forth in the second example.

FIG. 12 is a printed circuit board layout suitable for use in implementing the circuit set forth in the second example. Approximate board dimensions are about 102 mm (4 inches) by about 64 mm (2.5 inches). The thickness of the dielectric material is about 1.27 mm (0.050 inch), and the dielectric constant is about 9.2. The printed circuit board has conductive traces TL0–TL14 disposed thereon which are transmission lines respectively corresponding to the various characteristic impedances Z0–Z14. Approximate characteristic impedances and electrical lengths for each of the transmission lines are as follows.

TABLE 10

| TRANSMISSION LINE | CHARACTERISTIC IMPEDANCE | ELECTRICAL LENGTH |
|---|---|---|
| TL0 | Z0 = 10 Ohms | * |
| TL1 | Z1 = 10 Ohms | * |
| TL2 | Z2 = 10 Ohms | * |
| TL3 | Z3 = 2x Z1 | $\lambda g/8$ |
| TL4 | Z4 = 2x Z1 | $\lambda g/8$ |
| TL5 | Z5 = 15|Zin| | 0.075 $\lambda g$ |
| TL6 | Z6 = 15|Zin| | 0.075 $\lambda g$ |
| TL7 | Z7 = 22 Ohms | 0.045 $\lambda g$ |
| TL8 | Z8 = 28 Ohms | 0.12 $\lambda g$ |
| TL9 | Z9 = 28 Ohms | 0.12 $\lambda g$ |
| TL10 | Z10 = 10 Ohms | $\geq$0.07 $\lambda g$ |
| TL11 | Z11 = 50 Ohms | ** |
| TL12 | Z12 = 50 Ohms | ** |
| TL13 | Z13 = 50 Ohms | ** |
| TL14 | Z14 = 50 Ohms | Not applicable | where
*The respective electrical lengths of TL0, TL1, and TL2 are calculated from a Smith Chart to match the output impedance Zout of the transistor with a ten (10) Ohm impedance;
**The respective electrical lengths of TL11, TL12, and TL13 are calculated from a Smith Chart to match a fifty (50) Ohm impedance with a ten (10) Ohm impedance;
$\lambda g$ is the wavelength of the oscillating frequency;
$Z_{in}$ is the input impedance of the gate G; and
$Z_{out}$ is the output impedance of the drain D.

Ground areas 741 are also disposed on a top side of the printed circuit board and are electrically connected to a ground plane on the opposite side of the printed circuit board by plated through holes or other conventional methods for good RF-grounding practices. A conductive area 743 is isolated from the ground area 41 and provides a connection area for the DC supply voltage Vdss. Another conductive area 745 provides a connection area for the DC supply voltage Vgs.

The short length of transmission line TL0 attached to the drain D compensates for the capacitance of the drain. The stub lines TL1 and TL2 are configured to match the output impedance of the drain D. C1 and C2 are used as trimming capacitors to change the level of feedback for optimized output power and efficiency. Preferably, C1 and C2 each have a relatively high impedance of $X_{C1}=X_{C2}$=between about 150 and 250 Ohms. The relatively high impedance of C1 and C2 limits the RF voltage which transfers to the feedback circuits and creates an essentially open circuit condition on the ends of stub lines TL1 and TL2 distal to the drain. As discussed above, under this condition the RF voltage on the ends of stub lines TL1 and TL2 distal to the drain is limited to no more than about two times the drain RF voltage. The dual feedback configuration increases the positive feedback (e.g. beta) of the feedback circuits and an increased efficiency of the oscillator is observed.

As used herein, a "stub" refers to a branch off of a transmission line, typically forming a "T" junction with the transmission line. A microwave transmission line "stub" produces an immittance effect at the branch point in a guided wave structure by transforming the impedance seen at the end of the stub through a length of transmission line of the stub. The length of the stub is selected to have a particular characteristic impedance which produces the desired immittance at the branch point.

Figure 13:
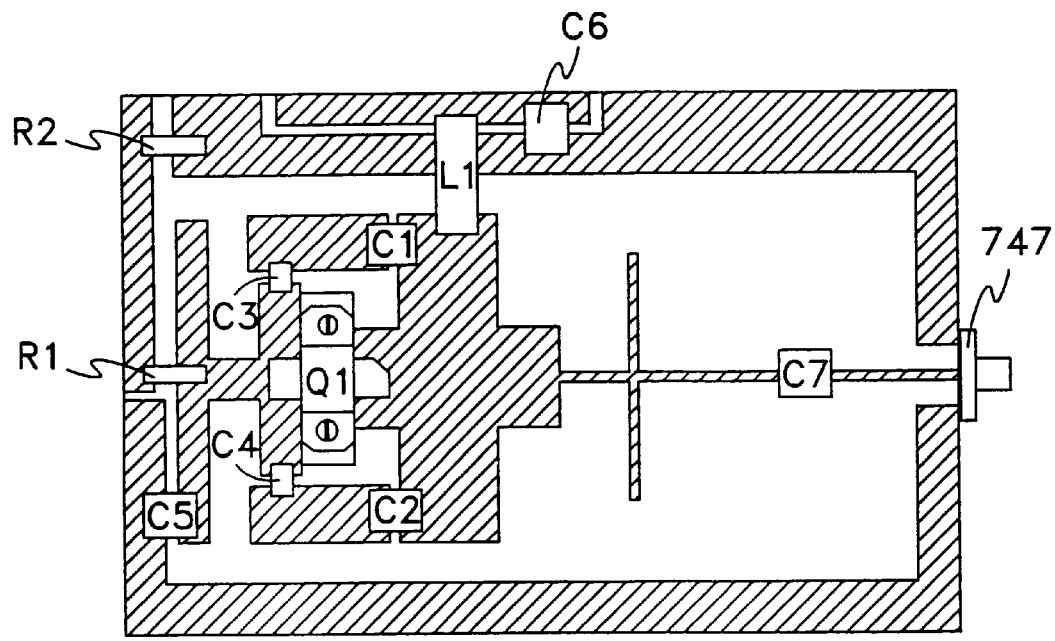
FIG. 13 is an assembly-level schematic diagram of the printed circuit board from FIG. 12 populated with suitable electronic devices and other parts for implementing the oscillator system of the second example.

In the circuit illustrated in FIGS. 11–13, high voltage damage to the transistor Q1 is ameliorated by providing low characteristic impedance lines TL5 (Z5) and TL6 (Z6) to transform the feedback impedance to the complex conjugate of the gate impedance. TL5 and TL6 are lines which prevent high voltage transients on the feedback circuit by producing an extra shunt capacitive effect at the gate G, and decreasing the peak voltage appearing at the gate G.

Transmission lines TL3 and TL4 provide feedback lines for the signals from C1 and C2, respectively. Capacitors C3 and C4 provide coupling between the feedback lines TL3 and TL4 and the protective stubs TL5 and TL6. The impedance of C3 and C4 is configured to be $X_{C3}=X_{C4}$=between about 8 and 10 Ohms at the oscillating frequency $\lambda g$.

Transmission line TL7 and tuning stubs TL8 and TL9 decrease the input impedance at the gate G and provide additional protection for the gate G from voltage transients on the feedback signal. Tuning stub TL8 may be trimmed (e.g. cut) to adjust the input impedance. Preferably, the sum of the lengths of lines TL7 and TL8 and the sum of the lengths of lines TL7 and TL9 are each about equal to one-half wavelength of the third harmonic of the oscillating frequency (i.e. $L_{TL7}+L_{TL8}=L_{TL7}+L_{TL9}=\lambda g/6$). Maintaining this length relationship increases the third harmonic signal in the gate voltage and increases efficiency.

Capacitor C5 is a variable capacitor which may be adjusted to tune the oscillating frequency. The oscillating frequency may be determined by the following equation:

$$2\pi\left(\frac{L_1}{\lambda_{g1}}+\frac{L_3}{\lambda_{g3}}+\frac{L_5}{\lambda_{g5}}\right)+\arctan\left(\frac{\omega C_{in}Z_5}{2}\right)+\varphi_{Q1}- \qquad \text{Equation(5)}$$

$$\arctan\left(\frac{1}{\omega C_1(Z_1+Z_3)}\right) - \arctan\left(\frac{1}{\omega C_3(Z_3+Z_5)}\right) = \pi$$

where:
- $L_1$ is the length of transmission line TL1
- $L_3$ is the length of transmission line TL3
- $L_5$ is the length of transmission line TL5
- $\lambda_{gi}$ is the appropriate wavelength at the oscillating frequency for the transmission line TLi
- $\omega$ is the oscillating frequency
- $Z_1$ is the characteristic impedance of transmission line TL1
- $Z_3$ is the characteristic impedance of transmission line TL3
- $Z_5$ is the characteristic impedance of transmission line TL5
- $\omega_{Q1}$ is the delay phase angle inside the transistor Q1
- $C_{in}$ is the input capacitance created by the transistor gate capacitance, the capacitance of transmission lines TL7, TL8, and TL9, and capacitor C5.

FIG. 13 is an assembly-level schematic diagram of the printed circuit board from FIG. 12 populated with suitable electronic devices and other parts for implementing the oscillator system of the second example. The transistor Q1 is mounted to a metal plate which is electrically connected to ground as described above with respect to the first example. The other transistor terminals and electrical components are mechanically and electrically connected to the micro-strip lines and/or printed circuit board by soldering or other conventional means. A coaxial connector 747 is provided on the printed circuit board with its center conductor connected to the output of the capacitor C7 and its outer conductor connected to ground. C7 is referred to as a "blocking" capacitor because it acts to block the output from DC bias.

General operation of the circuit is as described above with respect to the first example. The drain voltage may be adjusted from about 14V to about 28V and the gate bias voltage is about 4 volts. The practical operating range for the second example is from about 10 W to about 100 W of output power over a frequency range of about 680 MHz to about 915 MHz. Higher efficiencies are typically obtained at the lower end of the frequency range. Those skilled in the art will understand that the amount of output power obtained is limited by the maximum operating characteristics of the active element and that higher output power may be provided by an oscillator system according to the invention utilizing an active element with correspondingly higher operating characteristics. Moreover, those skilled in the art will understand that the effective frequency range and oscillating frequency may be adjusted by appropriate sizing of the printed circuit board and transmission lines thereon and proper selection of the values for the discrete components.

Figure 14:
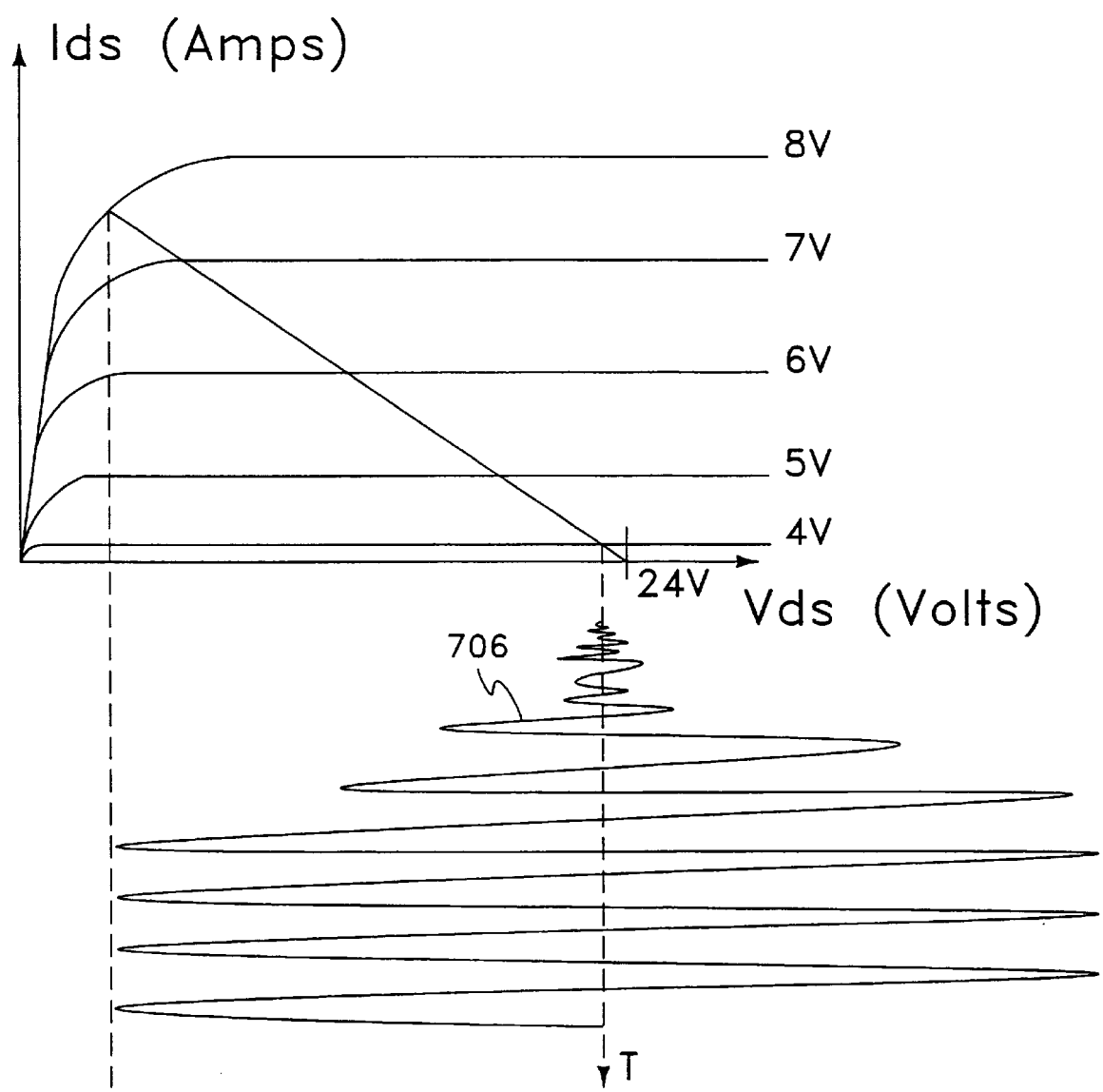
FIG. 14 is a combination graph of a characteristic I-V curve for the transistor and the output signal of the drain of the transistor.

FIG. 14 is a combination graph of a characteristic I-V curve for the transistor and the output signal of the drain of the transistor. As shown in FIG. 14, the signal 706 on the drain starts as random noise and oscillates with increasing amplitude until the transistor Q1 becomes saturated. The circuit then oscillates at a frequency where the following conditions are satisfied:

$$\beta \times A \geq 1 \qquad \text{Equation (6)}$$

and $$\Sigma \phi_i = 2\pi \qquad \text{Equation (7)}$$

where
- $\beta$ is the feedback transfer coefficient;
- A is the amplification coefficient for the amplifier element in a linear mode of operation; and
- $\phi_i$ is the phase shift of each element in the feedback loop.

Figure 15:
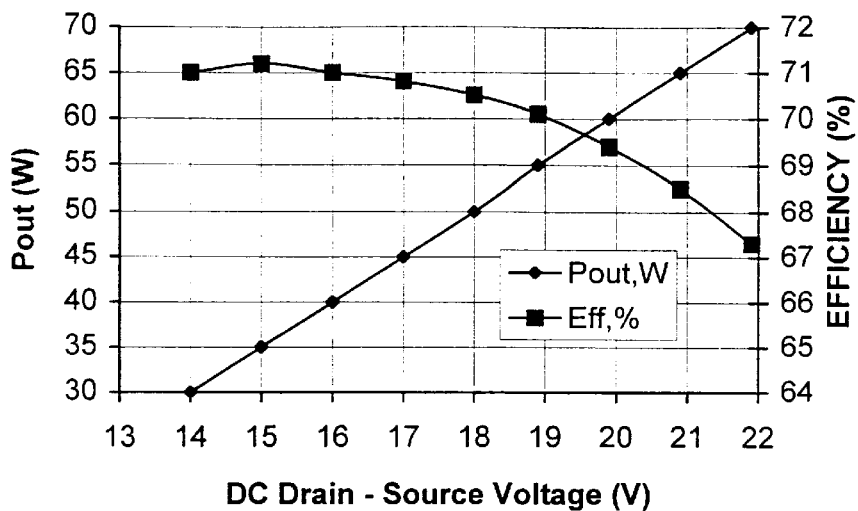
FIG. 15 is a combination graph of the output power and efficiency of the oscillator system in the second example as a function of the DC drain voltage.

FIG. 15 is a combination graph of the output power and efficiency of the oscillator system in the second example as a function of the DC drain voltage. As can be seen from FIG. 15, the output power increases linearly with the DC drain voltage from about 30 W at about 14 V Vdss to about 70 W at 22 V Vdss. Over this entire range of DC drain voltages, the DC to RF efficiency of the oscillator system is over 67%, peaking at about 71% efficiency at 15 V Vdss.

Figure 16:
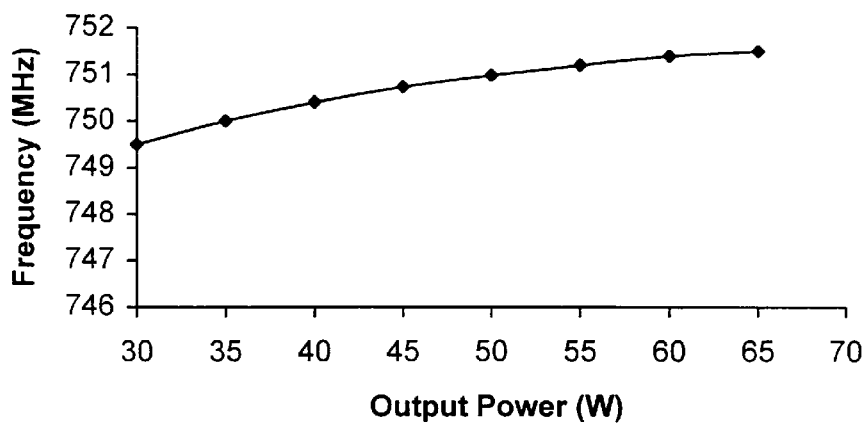
FIG. 16 is a graph of oscillating frequency as a function of output power.

FIG. 16 is a graph of oscillating frequency as a function of output power. As can be seen from FIG. 16, the oscillating frequency increases only slightly (e.g. by about 0.27%) as output power is increased from about 30 W to about 70 W. The change in frequency is a result of a change in the drain junction capacitance at the different DC voltages for the different output powers.

Figure 17:
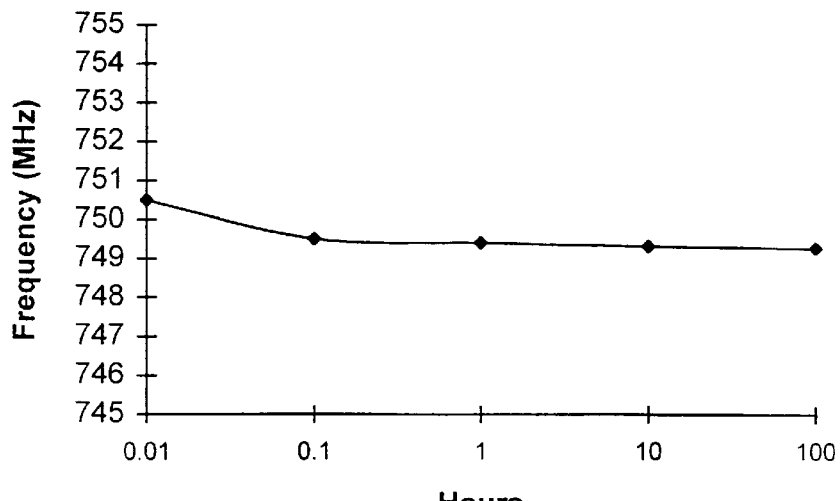
FIG. 17 is a graph of oscillating frequency versus time for an oscillator system operating at about 50 W with a drain voltage of about 18 V.

FIG. 17 is a graph of oscillating frequency versus time for an oscillator system operating at about 50 W with a drain voltage of about 18 V. As can be seen from FIG. 17, the oscillator system exhibits low drift of the oscillating frequency over about 100 hours of relatively constant temperature operation.

Thus, the second example of the invention provides a highly desirable combination of operating features. Namely, a highly efficient, high output power oscillator system with low drift of the oscillating frequency. The second example also exhibits substantially linear dependence of output power on the DC drain voltage. Advantageously, these and other features of the invention are achieved in an oscillator system having only a single active element, which provides lower cost and higher reliability as compared to prior art high power RF generator systems which required both a low power oscillator and an external amplifier (i.e. at least two active elements) to achieve high output power. The oscillator system according to the invention also advantageously provides small physical dimensions and low weight, thus making the system suitable for many practical applications.

Third Example of a High Power Oscillator

Figure 18:
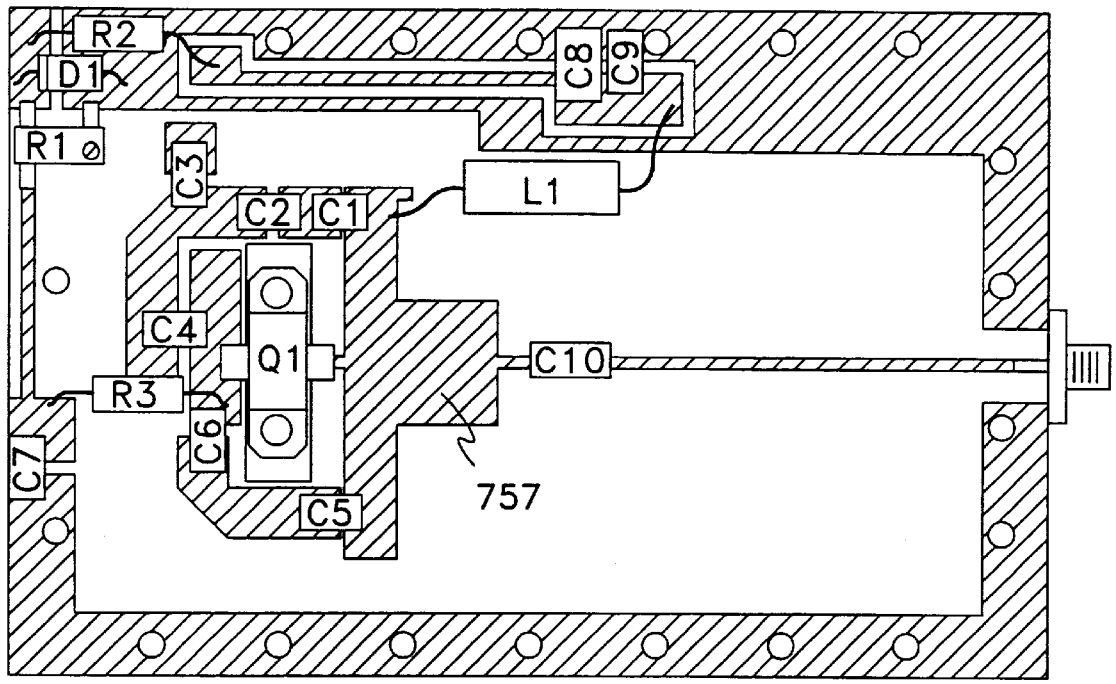
FIG. 18 is an assembly-level schematic diagram of a printed circuit board populated with suitable electronic devices and other parts for implementing a third example of an oscillator system according to the invention.

FIG. 18 is an assembly-level schematic diagram of a printed circuit board populated with suitable electronic devices and other parts for implementing a third example of an oscillator system according to the invention. The third example differs from the second example in that, among other things, the dual feedback circuits in the third example are asymmetrical.

The printed circuit board in the third example has approximate dimensions of about 102 mm (4 inches) by 64 mm (2.5 inches). The thickness of the dielectric material is about 1.25 mm (50 mils), and the dielectric constant is about 9.2.

The oscillator system according to the third example is operated in a frequency range of between about 790 to 920 MHz, with an output power ranging from about 30 W to about 70 W (corresponding to a DC drain voltage range of 18 V to 28 V). The circuit exhibits a DC to RF efficiency of between about 56 to 68% with a frequency stability of +/−0.5 MHz.

Fourth Example of a High Power Oscillator

Figure 19:
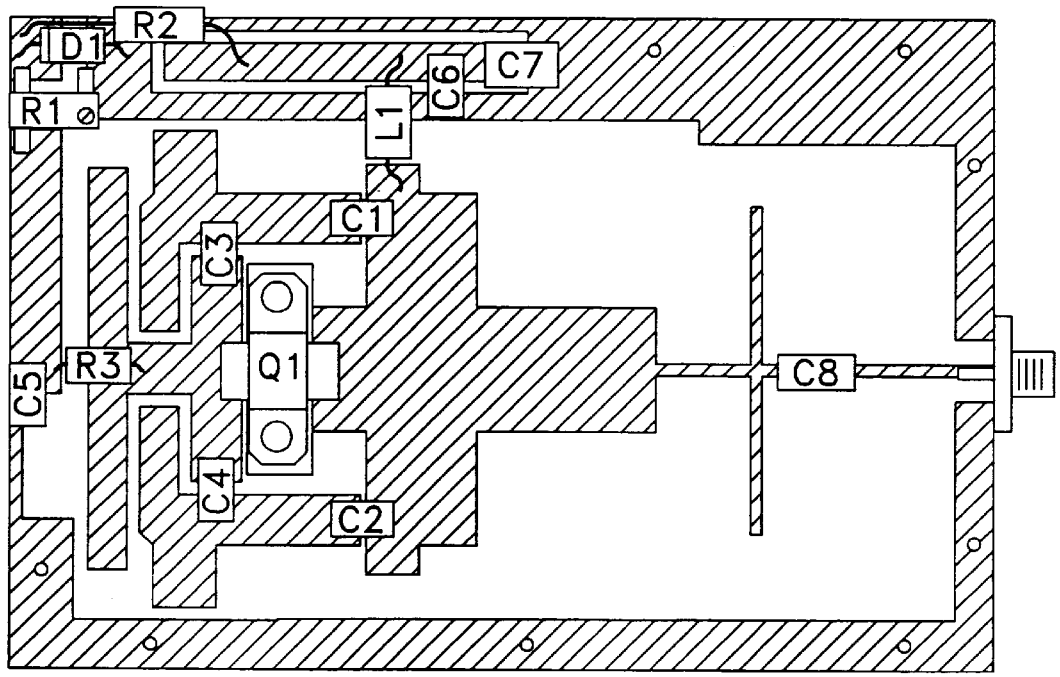
FIG. 19 is an assembly-level schematic diagram of a printed circuit board populated with suitable electronic devices and other parts for implementing a fourth example of an oscillator system according to the invention.

FIG. 19 is an assembly-level schematic diagram of a printed circuit board populated with suitable electronic devices and other parts for implementing a fourth example of an oscillator system according to the invention. The dual feedback circuits in the fourth example are substantially symmetrical. The fourth example differs from the second example in that, among other things, the fourth example utilizes a single DC power supply which is connected to the drain through an RF filter circuit (L1, C8, C9) and to the gate through a bias circuit (R1, R2, R3, D1). The fourth example exhibits better load matching and efficiency as compared to the second example.

The printed circuit board has approximate dimensions of about 102 mm (4 inches) by about 64 mm (2.5 inches). The thickness of the dielectric material is about 1.25 mm (50 mils), and the dielectric constant is about 9.2.

Fifth Example of a High Power Oscillator

Figure 20:
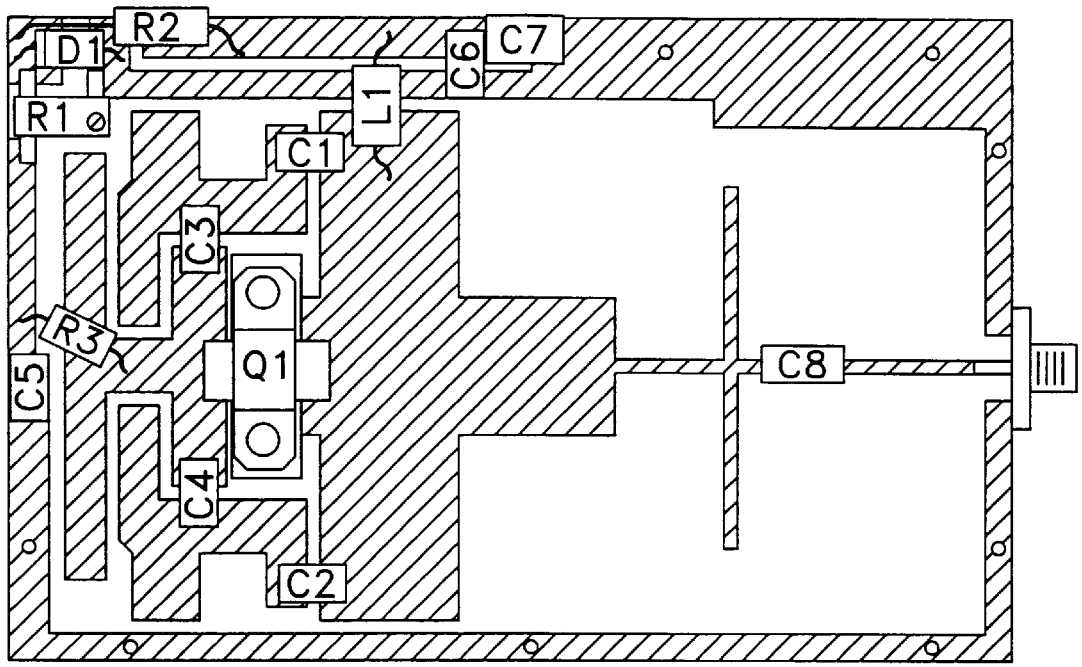
FIG. 20 is an assembly-level schematic diagram of a printed circuit board populated with suitable electronic devices and other parts for implementing a fifth example of an oscillator system according to the invention.

FIG. 20 is an assembly-level schematic diagram of a printed circuit board populated with suitable electronic devices and other parts for implementing a fifth example of an oscillator system according to the invention. The dual feedback circuits in the fifth example are substantially symmetrical. The fifth example is a variant of the fourth example as modified to match the impedance characteristics of a different power transistor.

The printed circuit board has approximate dimensions of about 102 mm (4 inches) by about 64 mm (2.5 inches). The thickness of the dielectric material is about 1.25 mm (50 mils), and the dielectric constant is about 9.2.

Sixth Example of a High Power Oscillator

Figure 21:
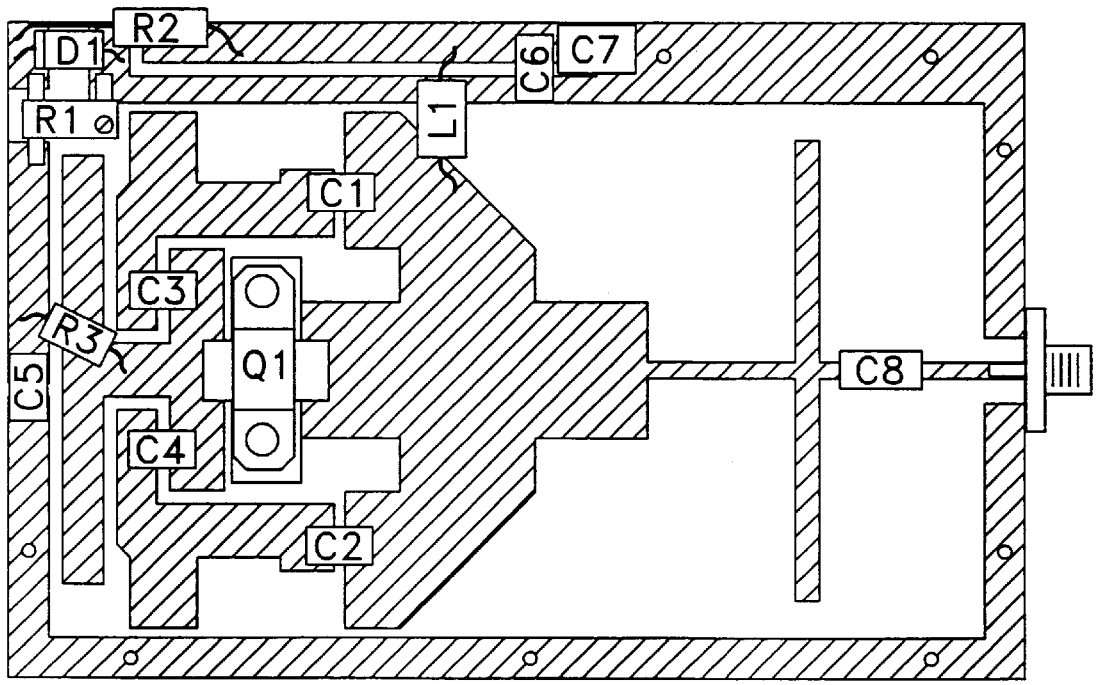
FIG. 21 is an assembly-level schematic diagram of a printed circuit board populated with suitable electronic devices and other parts for implementing a sixth example of an oscillator system according to the invention.

FIG. 21 is an assembly-level schematic diagram of a printed circuit board populated with suitable electronic devices and other parts for implementing a sixth example of an oscillator system according to the invention. The dual feedback circuits in the sixth example are substantially symmetrical. The sixth example is a variant of the fourth example as modified for a different dielectric material and thickness of the printed circuit board material. The output impedance matching circuit is reshaped with angled corners to provide the appropriate electrical length in substantially the same size printed circuit board.

The printed circuit board has approximate dimensions of about 102 mm (4 inches) by about 64 mm (2.5 inches). The thickness of the dielectric material (FR-4) is about 0.8 mm (31 mils), and the dielectric constant is about 4.

Seventh Example of a High Power Oscillator

Figure 22:
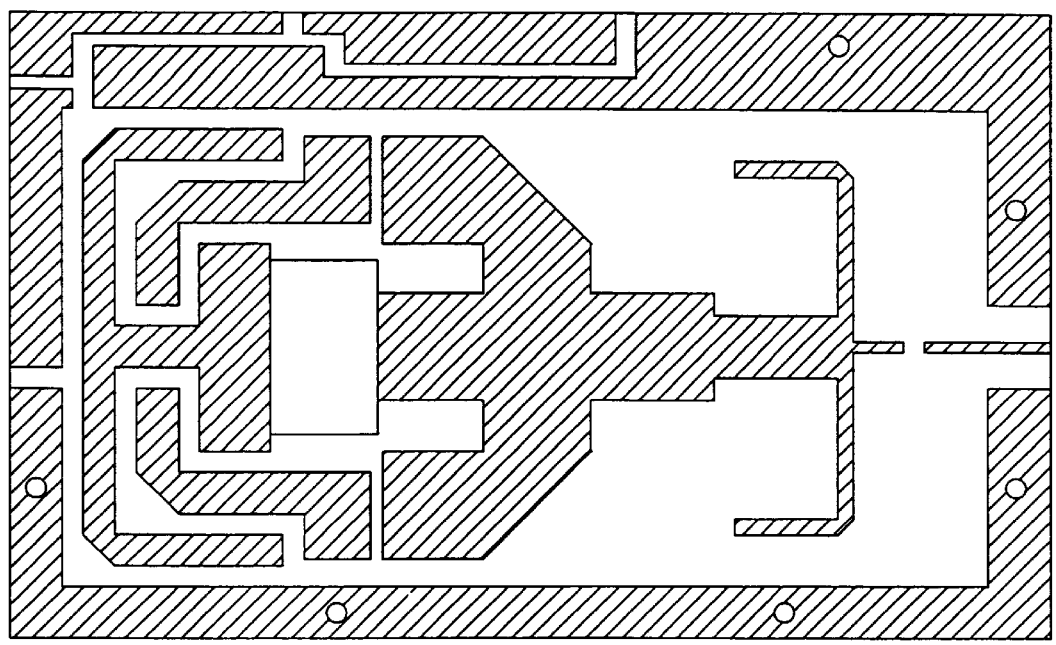
FIG. 22 is a printed circuit board layout suitable for use in implementing a seventh example of an oscillator system according to the invention.
Figure 23:
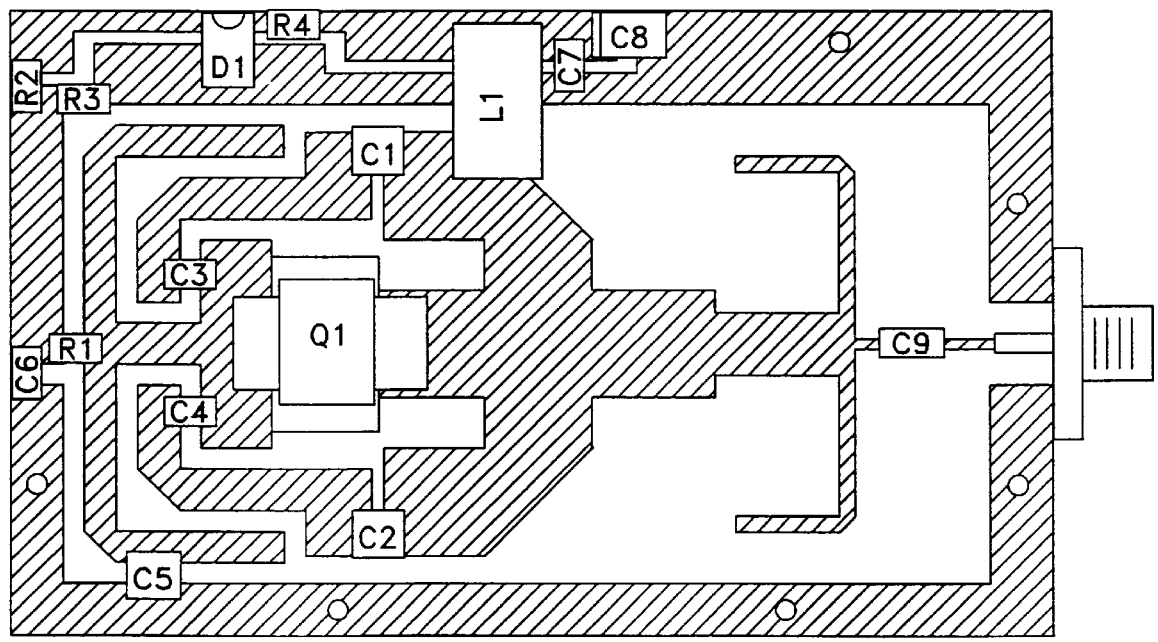
FIG. 23 is an assembly-level schematic diagram of the printed circuit board from FIG. 22 populated with suitable electronic devices for implementing the oscillator system of the seventh example.

FIG. 22 is a printed circuit board layout suitable for use in implementing a seventh example of an oscillator system according to the invention. FIG. 23 is an assembly-level schematic diagram of the printed circuit board from FIG. 22 populated with suitable electronic devices, including a surface mount version of the Motorola® transistor, and other parts for implementing the oscillator system of the seventh example. As shown in FIG. 23, the transistor Q1 is drain justified. The dual feedback circuits in the seventh example are substantially symmetrical. The seventh example is a variant of the sixth example as modified for a different dielectric material and reduced printed circuit board size. As compared with the preceding examples, the seventh examples provides the highest efficiency and smallest physical dimensions.

The printed circuit board has approximate dimensions of about 64 mm (2.5 inches) by about 38 mm (1.5 inches). The thickness of the dielectric material is about 0.6 mm (25 mils), and the dielectric constant is about 10.2.

While the invention has been described with respect to specific examples, the invention is not so limited. Based on the drawings, the detailed description, and the teachings set forth herein, numerous other examples will occur to those skilled in the art. For example, one of ordinary skill in the art will appreciate that other circuit configurations may be utilized to provide appropriate tuning and bias voltages for the various examples set forth herein. Moreover, the examples includes variable resistors and/or capacitors which may be replaced by fixed value components in production. The preceding examples should therefore be considered as illustrative only, with the scope and spirit of the invention being set forth in the appended claims.

In the examples noted above, the RF source preferably uses a commercially available silicon RF transistor, which meets certain cost and performance targets. Other suitable choices for the transistor technology include, but are not limited to, germanium, gallium and silicon carbide.

According to another aspect of the present invention, the lamp head is mounted directly on the same printed circuit board as the RF oscillator circuitry. In some examples, the printed circuit board in mechanically and electrically connected to a metal plate, referred to as a spreader plate, which has an opening under the printed circuit board in the area of the lamp head in order to allow the printed circuit board to flex in response to thermal forces.

According to another aspect of the present invention, a control circuit is provided for matching the operating characteristics of the lamp to the operating frequency of the oscillator at a plurality of different frequencies.

Figure 24:
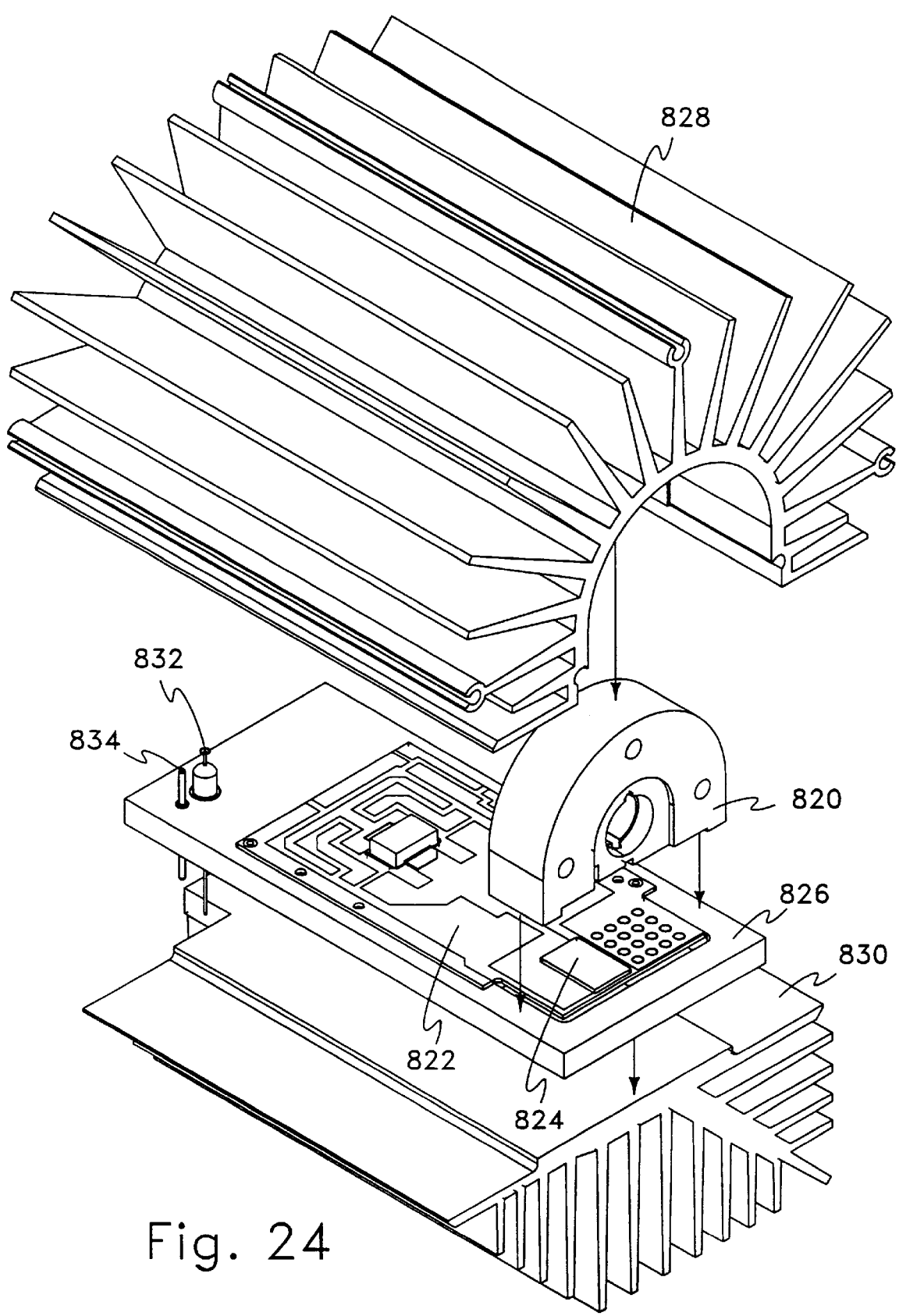
FIG. 24 is an exploded, perspective view of an example of a high brightness lamp according to the present invention.

FIG. 24 is an exploded, perspective view of an example of a high brightness lamp according to the present invention. A lamp head 820 is mounted on an oscillator board 822. A suitable dielectric material 824 is positioned between a high voltage plate of the lamp head 820 and a pad on the oscillator board 822. The oscillator board 822 is mechanically and electrically connected to a metal plate 826, hereinafter referred to as a spreader plate 826. A ground plate of the lamp head 820 is mechanically and electrically connected to a ground pad on the oscillator board 822. A perimeter portion of the lamp head 820 is also mechanically and electrically connected to the spreader plate 826. The lamp head 820 and oscillator board 822 are enclosed by a first heatsink 828 and a second heatsink 830. Power is supplied to the oscillator board 822 from an insulated pin 832 and a ground pin 834.

The lamp head 820 is constructed as described in detail in the parent application. As illustrated in FIG. 24, the lamp head 820 omits the optional protruding ridge. The oscillator board 822 is constructed as described in detail above in connection with FIGS. 22–23, except for the addition of the ground pad and power feed pad for connecting to the lamp head 820.

Figure 25:
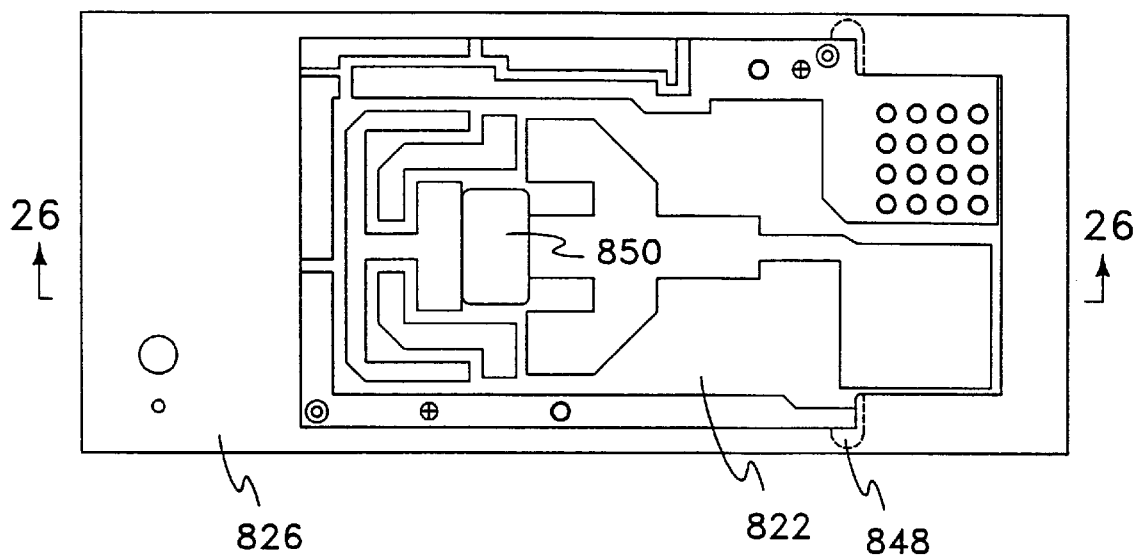
FIG. 25 is a schematic view of the oscillator board 822 and spreader plate 826.
Figure 26:
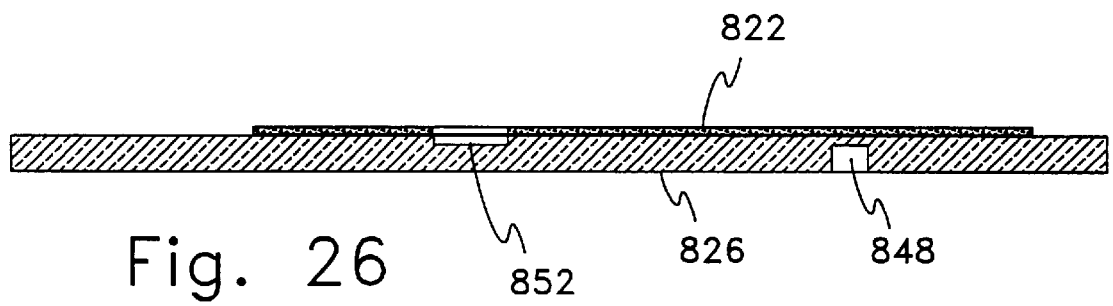
FIG. 26 is a cross sectional view taken along line 26—26 in FIG. 25.
Figure 27:
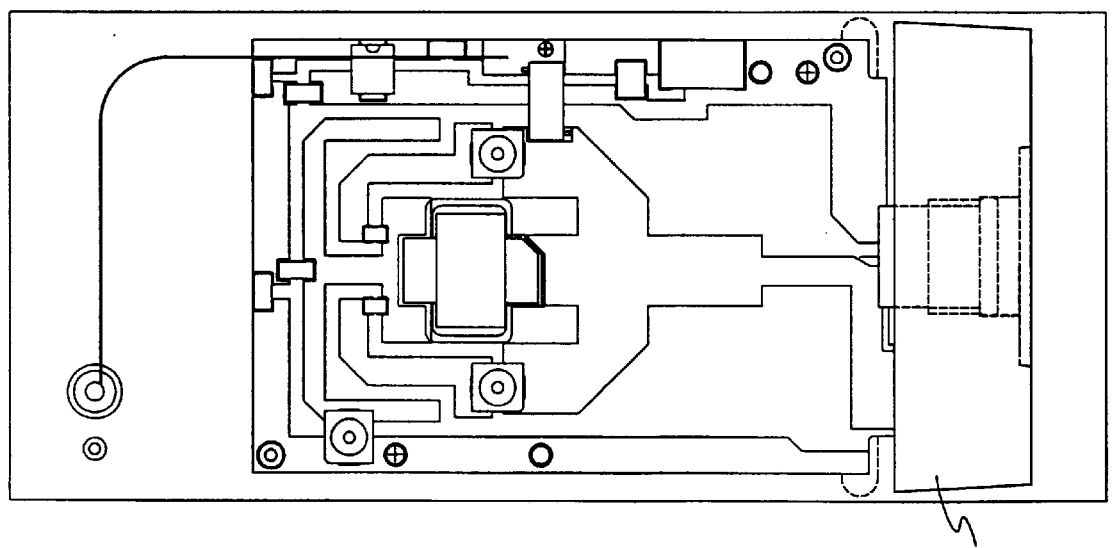
FIG. 27 is a schematic view of the lamp head mounted on the oscillator board and spreader plate.

FIG. 25 is a schematic view of the oscillator board 822 and spreader plate 826. FIG. 26 is a cross sectional view taken along line 26—26 in FIG. 25. A groove 848 is formed in the spreader plate 826 to restrict the transfer of heat from the lamp head 820 to the oscillator circuitry. The oscillator board 822 includes a cut-out section 850 and the spreader plate 826 includes a corresponding depression 852 where the active element of the oscillator is directly grounded to the spreader plate 826. FIG. 27 is a schematic view of the lamp head 820 mounted on the oscillator board 822 and spreader plate 826, with the oscillator board 822 populated with suitable electrical components, such as those described above in connection with FIGS. 22–23.

Cantilevered Oscillator Board

Figure 28:
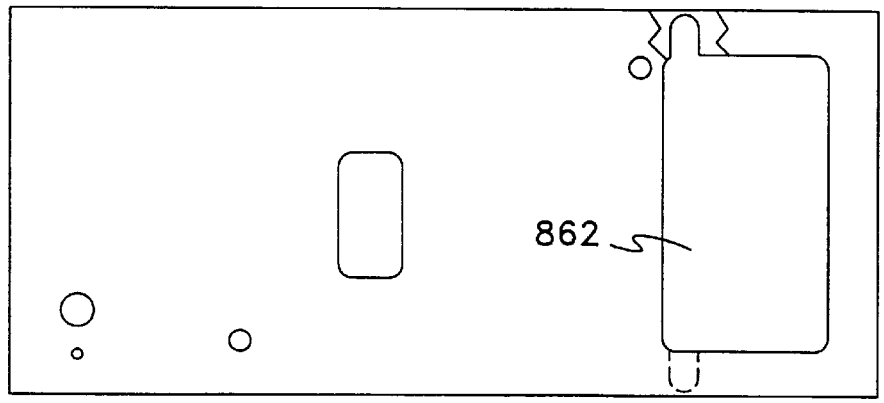
FIG. 28 is a schematic view of an alternative structure for the spreader plate.
Figure 29:
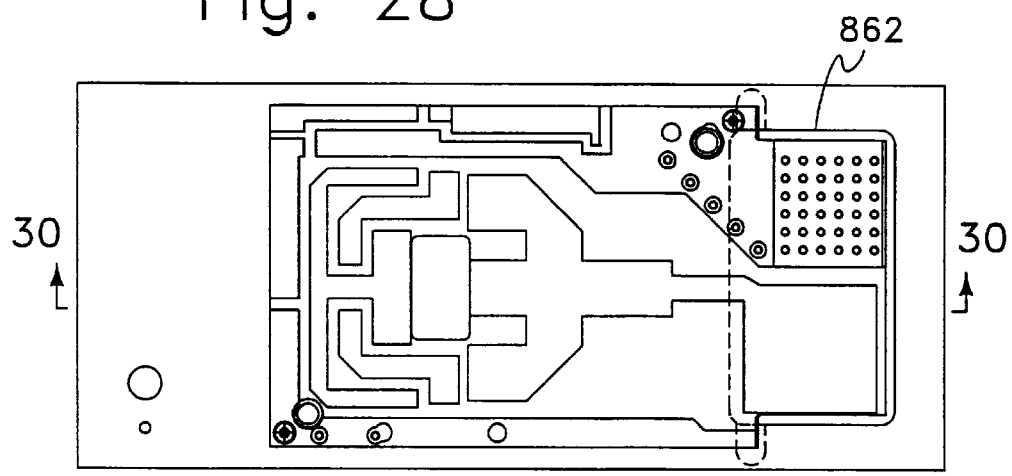
FIG. 29 is a schematic view of the oscillator board mounted on the alternative spreader plate.
Figure 30:
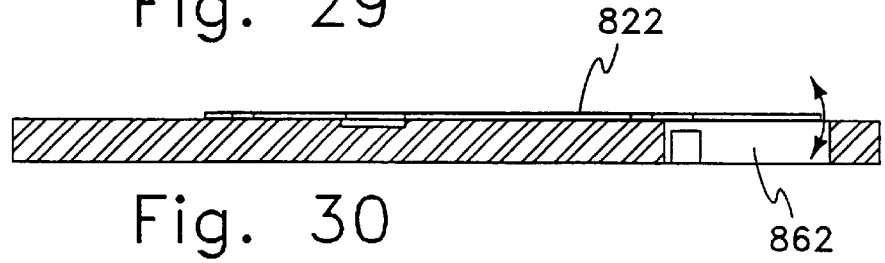
FIG. 30 is a cross sectional view taken along line 30—30 in FIG. 29.

With reference to FIGS. 28–30, the spreader plate is provided with an opening 862 and the oscillator board 822 is secured the spreader plate with a portion of the board cantilevered over the opening 862. The lamp head, including the capacitor stack is connected the oscillator board at the cantilevered portion. As shown in FIG. 30, the oscillator board can flex in the area of the lamp head connection.

As described in the parent application, a capacitor stack of dielectric and conductive plates is positioned between the lamp head and the PCB. The different materials utilized therein may have different coefficients of thermal expansion. For example, the dielectric material can be either rigid (as in glass or ceramic) or soft (as in plastics). The connection from the stack to the other elements is typically made with a tin lead solder which may be characterized as a plastic material at the lamp operating temperatures.

As the lamp head is heated, it may expand at a greater rate than the capacitor stack. Moreover, if the capacitor stack is compressed by a pre-load in assembly, high stresses may be generated within the rigid materials while distortions are generated in the plastic materials (which may relieve some of the pre-load). During thermal cycling of the lamp, the stack assembly may undergo tensile stresses which can lead to degradation or failure through delamination of the stack.

According to the present aspect of the invention, the lamp assembly is configured so that the PCB can flex in the area of the lamp head so that a small amount of motion generated by the different rates of thermal expansion can be accommodated without causing unit failure.

Figure 31:
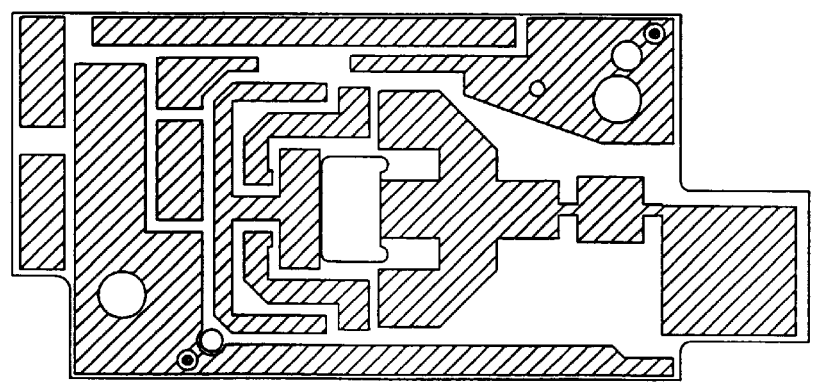
FIG. 31 is a schematic diagram of an alternative, preferred printed circuit board layout for the oscillator board.

FIG. 31 is a schematic diagram of an alternative, preferred printed circuit board layout for the oscillator board 822. In the preferred layout, the ground pad on the oscillator board is eliminated and the ground plate on the lamp head is connected directly to the spreader plate.

Separate RF Source

Figure 32:
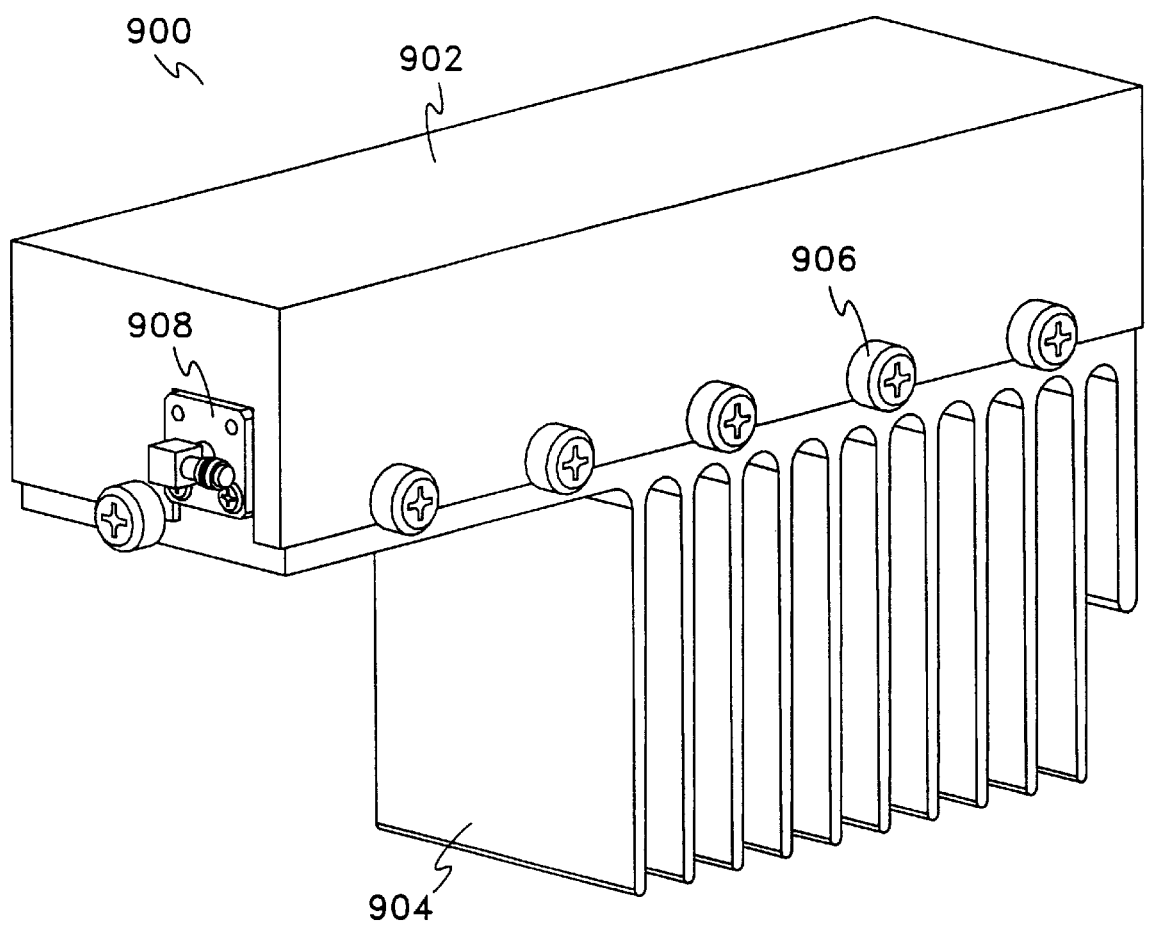
FIG. 32 is a perspective view of a preferred RF source for the separate lamp head described in the parent application.

FIG. 32 is a perspective view of a preferred RF source 900 for the separate lamp head described in the parent application. An RF power supply is housed in an enclosure 902 which is secured to a heatsink 904 by fasteners 906. A coaxial connector 908 is also mounted to the heatsink 904.

Figure 33:
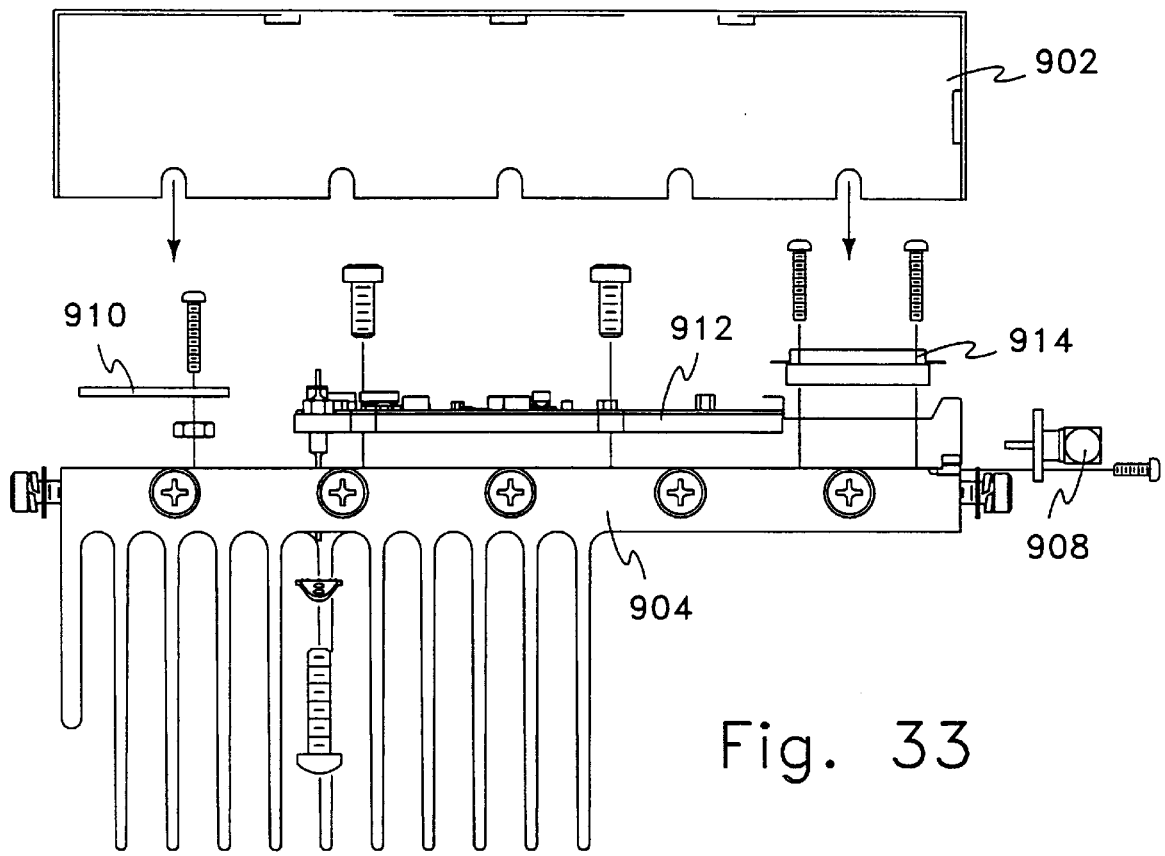
FIG. 33 is an exploded, schematic view of the RF source.
Figure 34:
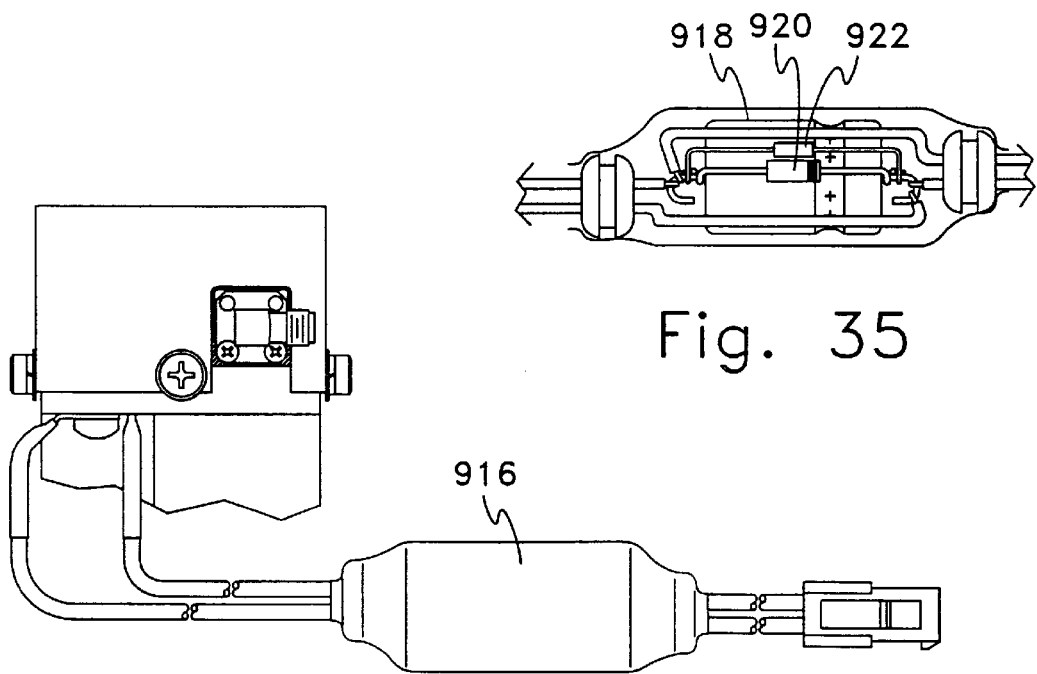
FIG. 34 is a schematic diagram of a power connection for the RF source.

FIG. 33 is an exploded, schematic view of the RF source 900. As shown in FIG. 33, the RF source 900 includes a control circuit 910, an oscillator assembly 912, and a circulator 914, connected as described hereinafter. FIG. 34 is a schematic diagram of a power connection for the RF source 900. Power is provided to the RF source 900 through a filter assembly 916, one lead of which is grounded to the heatsink 904 and the other of which provides DC power.

Figure 35:
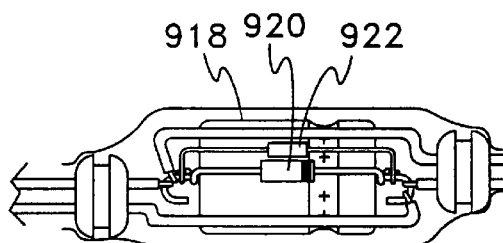
FIG. 35 is a partial cross sectional view of the power filter assembly.

FIG. 35 is a partial cross sectional view of the power filter assembly 916. A capacitor 918, a transient voltage suppressor 920, and a resistor 922 are connected in parallel between a DC supply voltage and ground. For example, the capacitor 918 has a value of about 1000 $\mu F$ and a rating of 50V, the voltage suppressor 920 is a Motorola P6KE27A, and the resistor has a value of about 6.6 K ohms with a rating of about 1/4 watt.

Oscillator Control Circuits

Figure 36:
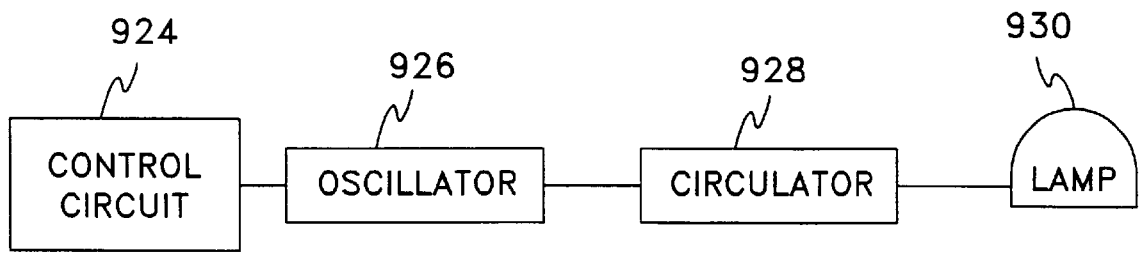
FIG. 36 is a diagram of an RF circuit including a control circuit which provides a control signal to an oscillator.
Figure 37:
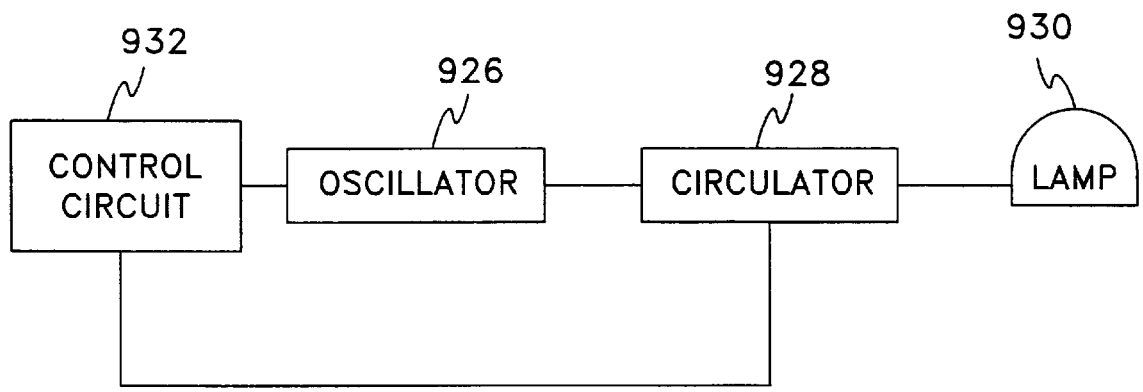
FIG. 37 is a diagram of an alternative RF circuit including a control circuit which provides a control signal to an oscillator.
Figure 38:
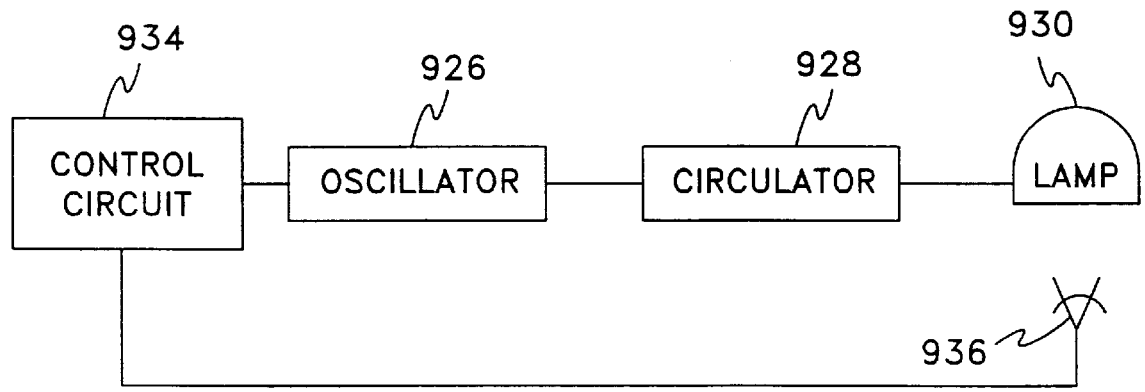
FIG. 38 is a diagram of another RF circuit including a control circuit which provides a control signal to an oscillator.

FIGS. 36–38 are block level schematic diagrams for various RF circuits powering a lamp according to the present invention. In the lamp of the present invention, especially when utilizing an indium halide only fill, the ignited cold lamp state has a significantly different electrical condition (e.g. impedance) as compared to the ignited hot state of the lamp. In order to improve starting and operation of the lamp, it is therefore preferred to provide a plurality of tuning states which correspond to various lamp parameters. These parameters include, for example, light output level, RF power reflection, and light color.

A feature of the oscillator described above is that the frequency of the oscillation may be tuned by adjusting a capacitor value. According to the present aspect of the invention, a control circuit is provided to switch the value of the capacitor in order to provide a desired frequency of oscillation.

The capacitor value may be switched, for example, by providing a varactor diode in series with the tuning capacitor, providing two tuning capacitors in series with one another which are both switched open or closed with a pin diode, and two tuning capacitors in parallel with each other with one being driven by a pin diode.

The control circuit may include, for example, a timer circuit based on observed lamp operating characteristics, a DC input current monitor, a light level output monitor, and an RF reflected power monitor.

FIG. 36 is a diagram of an RF circuit including a control circuit 924 which provides a control signal to an oscillator 926. The output of the oscillator 926 is directed to though a circulator 928 to an RF powered lamp 930. In the control circuit 924, the control signal is provided independent of any feed back from the rest of the circuit. For example, the control circuit 924 comprises a timer circuit configured to provide a suitable control signal based on timed intervals from when the lamp is switched on. The timed intervals are based on, for example, empirical observation of the lamp performance.

FIG. 37 is a diagram of an RF circuit including a control circuit 932 which provides a control signal to an oscillator 926. The output of the oscillator 926 is directed to though a circulator 928 to an RF powered lamp 930. In the control circuit 932, the control signal is provided based on feed back received from the circulator. For example, the control circuit monitors reflected RF power and adjust the frequency of the oscillator to obtain a minimum amount of reflected RF power.

FIG. 38 is a diagram of an RF circuit including a control circuit 934 which provides a control signal to an oscillator 926. The output of the oscillator 926 is directed to though a circulator 928 to an RF powered lamp 930. In the control circuit 934, the control signal is provided based on feed back received from the lamp. For example, a optical sensor 936 (e.g. a photo-detector) is positioned to monitor light output or light to sense light color. The control circuit monitors the measured quantity and adjust the frequency of the oscillator accordingly.

Figure 39:
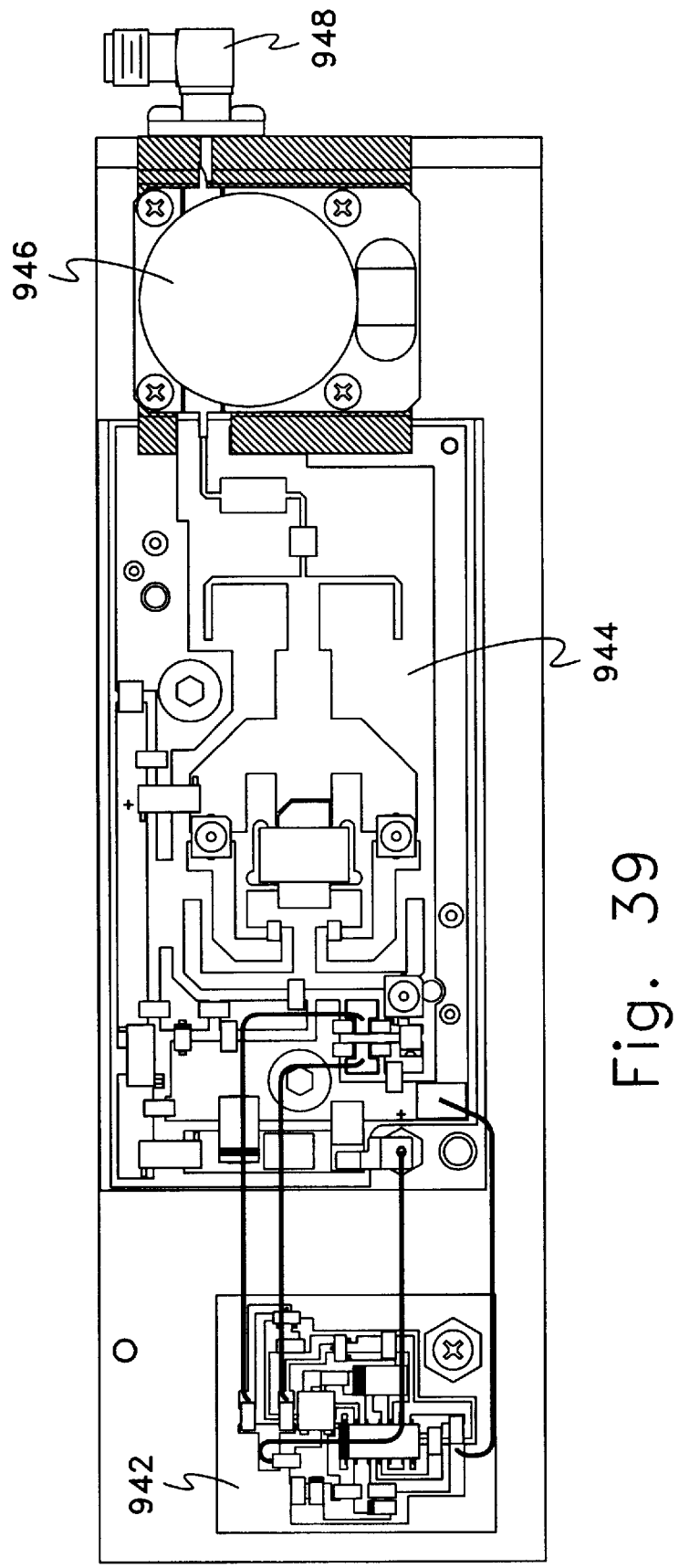
FIG. 39 is a schematic diagram of a preferred RF circuit according to the invention.

FIG. 39 is a schematic diagram of a preferred RF circuit according to the invention. A timer circuit 942 provides control signals to adjust the frequency of an oscillator 944. An output of the oscillator 944 is provided to a circulator 946. The output of the circulator 946 is connected to the center conductor of a coaxial connector 948.

The circulator is a non-reciprocal device that reduces the effects of the lamp load and its changing impedances on the power, frequency, voltages, and currents of the oscillator. The circulator improves the ability to perform tuning of the oscillator.

Based on empirical observations, the lamp of the present invention operated better with two tuning states. The oscillator board is constructed as described in connection with FIGS. 22–23, except that a varactor diode D2 is connected in series with the tuning capacitor C14. When the varactor diode is off, the frequency of the oscillator is adjusted to be somewhat lower (corresponding to a first tuning state) as compared to the frequency of the oscillator when the varactor diode is on (corresponding to a second tuning state). The first tuning state is preferred while the lamp is igniting and during steady state operation. The second tuning state is preferred after the lamp has ignited, but before the lamp reaches full output (also referred to as run-up).

The timing circuit is configured to begin a first timer when the lamp is turned on. Initially, the varactor diode is off and the lamp operates in the first tuning state. After a suitable period of time has passed for the lamp to ignite (based on empirical observation), the first timer expires and the timing circuit switches in the varactor diode to switch the oscillator to the second tuning state. The timing circuit begins a second timer which allows a suitable period of time for run-up. After the second timer expires, the varactor diode is switched off and the lamp operates in steady state in the first tuning state.

Figure 40:
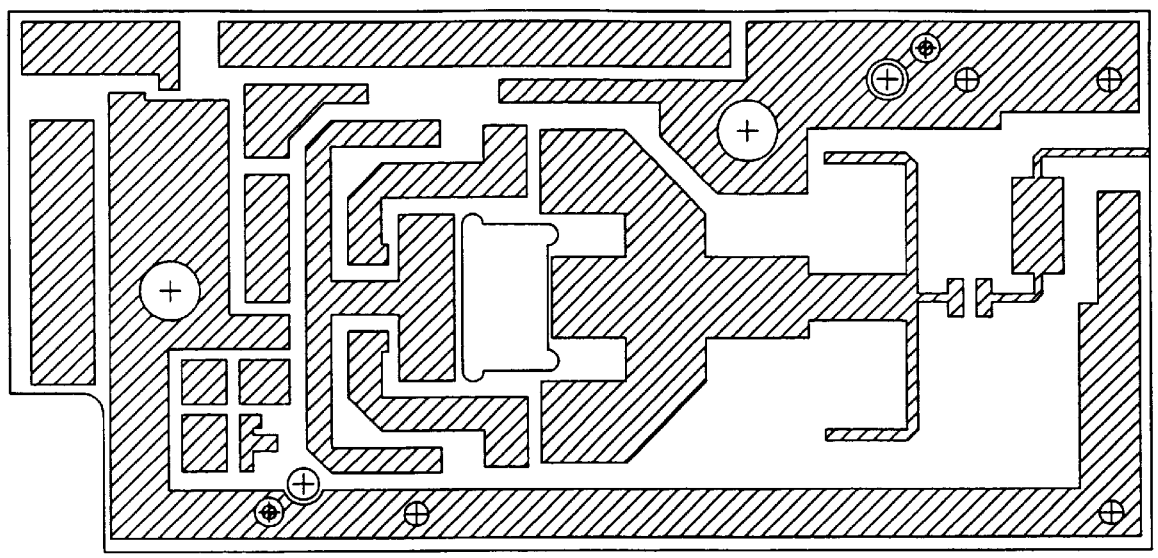
FIG. 40 is a schematic diagram of an exemplary printed circuit board layout for the oscillator board described in connection with FIG. 39.
Figure 41:
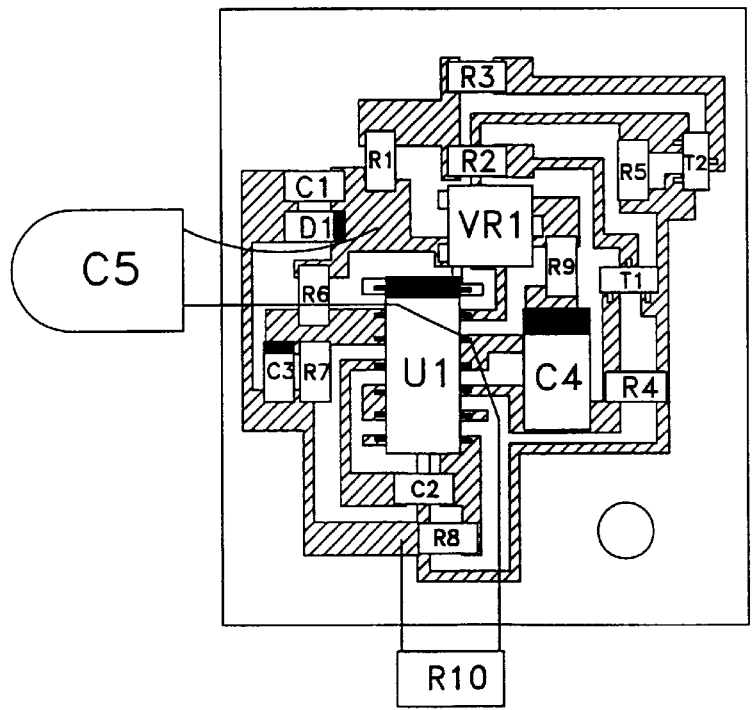
FIG. 41 is a schematic diagram of a timer circuit according to the invention.

FIG. 40 is a schematic diagram of an exemplary printed circuit board layout for oscillator board described in connection with FIG. 39. FIG. 41 is a schematic diagram of a timer circuit according to the invention. Integrated circuit U1 is a quad 2-input nor gate logic device. The timing intervals are determined by the decay of the various capacitive elements.

Alternatively, each of control circuit 924, 932, and 934 may comprise a microprocessor based circuit or a microcontroller programmed to provide a control signal to adjust the oscillator frequency. For example, a timer circuit is readily implemented using a micro-controller. The above-described circulator feedback and/or sensor feedback may be provided as information to the micro-controller. The micro-controller can use the information in an algorithm (e.g. a frequency dithering technique) to determine if the frequency needs to be adjusted. For example, the micro-controller can periodically make small adjustments to the frequency and determine the effect on the lamp performance in accordance with the feedback information. Such techniques provides automatic real-time tuning of the oscillator frequency. Other types of feedback (e.g. a bidirectional coupler) may also be used.

While the invention has been described with respect to specific examples, the invention is not so limited. Based on the drawings, the detailed description, and the teachings set forth herein, numerous other examples will occur to those skilled in the art. The preceding examples should be considered as illustrative only, with the scope and spirit of the invention being set forth in the following claims.

What is claimed is:

1. An oscillator, comprising:

an amplifier having an input and an output; and an impedance transformation network connected between the input of the amplifier and the output of the amplifier, wherein the impedance transformation network is configured to provide suitable positive feedback from the output of the amplifier to the input of the amplifier to initiate and sustain an oscillating condition, and wherein the impedance transformation network is configured to protect the input of the amplifier from a destructive feedback signal.

2. The oscillator according to claim 1, wherein a load is connected to the output of the amplifier and wherein the impedance transformation network is configured to protect the input of the amplifier from the destructive feedback signal as the load varies from a low impedance to a high impedance.

3. The oscillator according to claim 2, wherein the impedance transformation network is configured to protect the input of the amplifier from the destructive feedback signal as the load varies from a short circuit to an open circuit.

4. The oscillator according to claim 1, wherein the impedance transformation network comprises only micro-strip transmission lines, stubs, and non-inductive elements.

5. The oscillator according to claim 1, wherein the impedance transformation network comprises micro-strip transmission lines, stubs, and capacitor elements.

6. The oscillator according to claim 5, further comprising a tuning circuit having micro-strip transmission lines connected to the input of the amplifier, wherein the output of the amplifier produces an RF output voltage having an oscillating frequency with a third harmonic thereof, and wherein a sum of the lengths of the tuning circuit transmission lines is about one-half wavelength of the third harmonic of the oscillating frequency.

7. The oscillator according to claim 1, wherein the destructive feedback signal comprises a high voltage and wherein the impedance transformation network is configured to prevent the high voltage from building up at the output of the amplifier.

8. The oscillator according to claim 7, wherein the impedance transformation network is further configured to transform the high voltage on the output side of the amplifier to a high current on the input side of the amplifier.

9. The oscillator according to claim 1, wherein the impedance transformation network comprises dual feedback loops.

10. The oscillator according to claim 9, wherein the dual feedback loops are substantially symmetrical.

11. The oscillator according to claim 10, wherein the dual feedback loops are coupled to matching stubs at the input of the amplifier.

12. The oscillator according to claim 1, wherein the amplifier comprises a single active element providing an output signal having an output power in excess of 10 watts.

13. The oscillator according to claim 12, wherein the oscillator exhibits an efficiency greater than 50 percent.

14. The oscillator according to claim 1, further comprising an output impedance matching circuit having a first end connected to the output of the amplifier and a high impedance end coupled to the impedance transformation network.

15. The oscillator according to claim 14, wherein the output of the amplifier produces an RF output voltage and wherein the output impedance matching circuit comprises stubs configured to limit a reflected voltage on the high impedance end to at most two times the RF output voltage from the output of the amplifier.

* * * * *